US007260370B2

(12) United States Patent
Wang et al.

(10) Patent No.: US 7,260,370 B2
(45) Date of Patent: Aug. 21, 2007

(54) WIRELESS COMMUNICATION SYSTEM USING A PLURALITY OF ANTENNA ELEMENTS WITH ADAPTIVE WEIGHTING AND COMBINING TECHNIQUES

(76) Inventors: James June-Ming Wang, 1473 Waverly Rd., San Marino, CA (US) 91108; Jack Winters, 103 Old Wagon Rd., Middletown, NJ (US) 07748; Meng Chang Doong, 1001 N. Stoneman Ave., #D, Alhambra, CA (US) 91801; Chau Chin Yang, 1841 S. Westgate Ave., Los Angeles, CA (US) 90025

( * ) Notice: Subject to any disclaimer, the term of this patent is extended or adjusted under 35 U.S.C. 154(b) by 413 days.

(21) Appl. No.: 10/732,003

(22) Filed: Dec. 10, 2003

(65) Prior Publication Data

US 2006/0135097 A1 Jun. 22, 2006

(51) Int. Cl.
*H04B 17/02* (2006.01)
(52) U.S. Cl. .................. 455/135; 455/132; 455/134; 455/133; 455/137; 455/232; 375/144; 375/142
(58) Field of Classification Search ............. 455/132, 455/133, 134, 135, 137; 375/144
See application file for complete search history.

(56) References Cited

U.S. PATENT DOCUMENTS

| 4,736,460 A | 4/1988 | Rilling | 455/283 |
|---|---|---|---|
| 4,797,950 A | 1/1989 | Rilling | 455/276 |
| 5,819,168 A | 10/1998 | Golden et al. | 455/303 |
| 5,887,038 A | 3/1999 | Golden | 375/347 |
| 6,049,705 A | 4/2000 | Xue | 455/277.1 |
| 6,115,762 A | 9/2000 | Bell et al. | 710/62 |
| 6,161,001 A * | 12/2000 | Iinuma | 455/137 |
| 6,385,185 B1 | 5/2002 | Huang | 370/342 |

(Continued)

OTHER PUBLICATIONS

John R. Treichler and Brian G. Agee, A New Approach to Multipath Correction of Constant Modulus Signals, Apr. 2, 1983, IEEE Transactions on Acoustics, Speech, and Signal Processing, vol. ASSP-31, p. 461.*

*Primary Examiner*—Nay Maung
*Assistant Examiner*—Richard Chan
(74) *Attorney, Agent, or Firm*—Patentry; Peter G. H. Hwang

(57) ABSTRACT

The present invention provides a method and system for operating a wireless communication system in which received signals from a plurality of antennas are weighted and combined with a beam forming operation to form an output signal. The beam forming operation determines weights adjusted to increase a desired signal power in the output signal while reducing the power in the output signal of out-of-band components. In an embodiment of the present invention, beam forming operations are performed with maximal ratio combining (MRC). Alternatively, a constant modulus algorithm (CMA) can be used for beam forming operations. In an alternate embodiment, improved interference suppression is performed with a novel algorithm referred to as an interference nulling algorithm (INA). The INA receives an error signal which is 180° out of phase with a combination of the channels for individual antennas, referred to as the SUM channel. The error signal is determined by complex conjugate multiplication of the individual signals and a reference complex signal. It is desirable to simultaneously achieve diversity and combining gain and suppress the adjacent channel by combining the weight generation for MRC and that for INA, as described above, to generate antenna weights similar to those of MMSE combining.

23 Claims, 20 Drawing Sheets

U.S. PATENT DOCUMENTS

| | | | |
|---|---|---|---|
| 6,546,043 B1 | 4/2003 | Kong | 375/148 |
| 6,549,585 B2 | 4/2003 | Naguib et al. | 375/267 |
| 6,574,270 B1 | 6/2003 | Madkour et al. | 375/148 |
| 6,580,705 B1 * | 6/2003 | Riazi et al. | 370/347 |
| 6,680,699 B2 * | 1/2004 | Voyer | 342/378 |
| 6,914,539 B2 * | 7/2005 | Hoctor et al. | 340/870.12 |
| 6,990,137 B2 * | 1/2006 | Smee et al. | 375/142 |
| 2003/0162566 A1 * | 8/2003 | Shapira et al. | 455/561 |
| 2004/0071104 A1 * | 4/2004 | Boesel et al. | 370/320 |

* cited by examiner

B Implementation with less delay differences

WIRELESS COMMUNICATION SYSTEM USING A PLURALITY OF ANTENNA ELEMENTS WITH ADAPTIVE WEIGHTING AND COMBINING TECHNIQUES

BACKGROUND OF THE INVENTION

1. Field of the Invention

This invention relates generally to wireless communication systems. More particularly, it relates to a wireless communication system using a plurality of antenna elements with weighting and combining techniques for optimizing antenna diversity and combining gain.

2. Description of the Related Art

Recently, the market for wireless communications has enjoyed tremendous growth. Wireless technology now reaches or is capable of reaching virtually every location on the face of the earth. Hundreds of millions of people exchange information every day using pagers, cellular telephones and other wireless communication products.

With the appearance of inexpensive, high-performance products based on the IEEE 802.11a/b/g Wireless Fidelity (Wi-Fi) standard, acceptance of wireless local area networks (WLANs) for home, Small Office Home Office (SOHO) and enterprise applications has increased significantly. IEEE 802.11b/g is a standard for a wireless, radio-based system. It operates in the unlicensed 2.4 GHz band at speeds up to 11 M bits/sec for IEEE 802.11b and 54 M bits/sec for IEEE 802.11g. The IEEE 802.11b/g specification sets up 11 channels within the 2.4 GHz to 2.4835 GHz frequency band which is the unlicensed band for industrial, scientific and medical (ISM) applications. IEEE 802.11a is another standard for a wireless, radio-based system in the ISM band. It operates in the unlicensed 5-GHz band at speeds up to 54 M bits/sec.

It has been found that WLANs often fall short of the expected operating range when actually deployed. For example, although a wireless Access Point (AP) is specified by a vendor as having an operating range of 300 feet, the actual operating range can vary widely depending on the operating environment.

In particular, WLAN performance can be greatly degraded by direct and multipath radio interference. Multipath occurs in wireless environments because the radio frequency (RF) signal transmitted by the subscriber is reflected from physical objects present in the environment such as buildings. As a result, it undergoes multiple reflections, refractions, diffusions and attenuations. The base station receives a sum of the distorted versions of the signal (collectively called multipath).

Similarly, in any indoor wireless system, multipath interference effects occur when the transmitted signal is reflected from objects such as walls, furniture, and other indoor objects. As a result of multipath, the signal can have multiple copies of itself, all of which arrive at the receiver at different moments in time. Thus, from the receiver's point of view, it receives multiple copies of the same signal with many different signal strengths or powers and propagation delays. The resultant combined signal can have significant fluctuation in power. This phenomenon is called fading.

Unlike all other parts of the radio spectrum, a license is not required to operate a transmitter in the ISM bands specified in IEEE 802.11 a/b/g. In exchange for this license-free environment, users implementing the IEEE 802.11 b/g and IEEE 802.11a standards are subject to interference from other users of the bands. The 2.4 to 2.4835 GHz ISM band is particularly sensitive to interference because it is populated with numerous wireless networking products such as Bluetooth systems, HomeRF systems, IEEE 802.11b WLAN devices, microwave ovens, and cordless phones that can result in significant interference. This interference is the result of a myriad of incompatible data transmission techniques, uncoordinated usage of spectrum, and over-subscription of the available spectrum.

Many devices operating in the 2.4 to 2.4835 GHz ISM band can either be classified as direct sequence spread spectrum (DSSS) or frequency hopping spread spectrum (FHSS) systems. The DSSS data transmission scheme is used primarily by IEEE 802.11b systems. FHSS systems, such as Bluetooth devices, differ from DSSS systems in their implementation for avoiding interference. FHSS systems avoid interference with other transmission signals in the same band by hopping over many different frequency channels. To provide FHSS systems with more bandwidth, the United States Federal Government Federal Communications Commission (FCC) has allowed FHSS systems to operate at wider bandwidths. The operation of FHSS systems at wider bandwidths has the potential to increase interference between DSSS and FHSS products. The interference level of narrowband FHSS systems on DSSS transmission has already been found to be severe.

There are additional elements of performance degradation in a network of 802.11b/g WLAN access points (APs). Since the 802.11b/g channel bandwidth is approximately 16 MHz, only three non-overlapping channels operating in proximity can be accommodated without interfering with one another. The channel re-use factor imposes a severe restriction on implementation of 802.11b/g based systems which requires significantly more effort in the network deployment, and increases the chances of interference and packet collision especially within an environment with a dense user cluster, such as in an office building.

Several approaches for improving the operating performance and range in a fading environment have been suggested. In one conventional approach, selection antenna diversity is used to reduce the effect of multipath fading. Multiple antennas are located in different locations or employ different polarizations. As long as the antennas have adequate separation in space or have a different polarization, the signal arriving at different antennas experiences independent fading. Each antenna can have a dedicated receiver or multiple antennas can share the same receiver. The receiver(s) checks to see which antenna has the best receiving signal quality and uses that antenna for the signal reception. The performance gain thus achieved is called diversity gain. The performance gain increases with the number of diversity antennas. The drawback of the selection diversity approach using a single shared receiver is that fast antenna switching and signal quality comparison is required. Since an 802.11(a, b, g) signal has a short signal preamble, only two diversity antennas are typically employed. This achieves a diversity gain of approximately 6 dB in a flat Rayleigh fading environment at the required frame error rate. The diversity gain decreases to 3 dB when delay spread is 50 ns and 0 dB when delay spread is 100 ns.

U.S. Pat. No. 6,115,762 describes an embedded antenna formed on a printed circuit board installed in a computing device. The antenna may include multiple radiating and receiving elements for mitigating multipath effects and/or responding to steering circuitry to form a directed antenna beam.

In another conventional approach, signal combining is used to provide improved performance in a fading environment. Signal combining techniques employ multiple spatially separated and/or orthogonally polarized antennas. The received signal is obtained by combining the signals from the multiple antennas. One technique for providing optimal signal quality is known as maximal ratio combining (MRC). To achieve the best signal quality, the received signal from each antenna is phase-shifted such that the resultant signals from all antennas are in phase. In addition, the signal from each antenna is scaled in amplitude based on the square root of its received signal-to-noise ratio. In an open loop implementation, a training sequence is transmitted first, followed by the signal containing information content. The received signal from each antenna is downconverted and passed through a channel filter. Separately, the received signals from all antenna elements are initially multiplied by a set of antenna weights (with arbitrary initial values) before they are combined into a single signal. The combined signal is then downconverted and passed through a channel filter. The antenna weights are a set of complex baseband signals and are derived by correlating received signal from each antenna element with the combined signal. Signal correlation is performed by multiplying the complex conjugate of the received signal from each antenna with the combined signal (called the reference signal) and passing it through a low pass filter (or integrator). Assuming that the averaged received noise power is the same in all received signals, the received signal envelope is proportional to the square root of the received signal-to-noise ratio. Under this condition, the magnitude of the antenna weight is proportional to the square root of the received signal-to-noise ratio. The generated set of antenna weights thus derived achieves the criterion for maximal ratio combining and the combined signal maximizes the received signal-to-noise ratio. Once the values are derived, the antenna weights are updated. The disadvantage of the open loop implementation is that the errors in antenna weights can accumulate over the signal processing steps. If there is any error in the derived antenna weights, the system can not detect the error automatically since there is no feedback mechanism. In addition, the system needs to detect the signal arrival and automatically activate the open loop antenna weight estimation process and update the antenna weight upon completion of the required steps, which increases the complexity of the system. Another disadvantage of the open loop implementation occurs when the initial set of antenna weights happen to produce a combined signal whose power is significantly lower than those from individual antenna. The antenna weight thus derived can thus have significant error due to the low signal level of the combined signal.

Another combining technique that maximizes the output signal-to-interference-plus-noise ratio is known as minimum mean square error (MMSE) combining. Signal combining techniques typically achieve better performance than the selection diversity antenna approach at the expense of added implementation complexity.

The signals can be combined with combining techniques based on a weighting scheme. Weights used in combining techniques can be generated with blind and nonblind techniques. In nonblind techniques, the received signal is demodulated and data sequences in the received signal are used to determine the portion that is the desired signal and the portion that is noise and interference. The demodulated signal is used to determine the combining weights through correlation with the received signals. In blind techniques, a property of the signal is used to distinguish it from interference and noise. In one approach, a constant modulus algorithm (CMA) is used to take advantage of a signal property of a constant signal envelope in order to generate a set of antenna weights such that the constant envelope property can be maintained. A shortcoming with nonblind techniques is that they require substantial modification of receiver application specific integrated circuit (ASIC) (baseband and media access controller (MAC), to use the demodulated signal. Thus, nonblind techniques generally must be incorporated into each vendor's WLAN integrated circuit (IC). Blind techniques do not use the demodulated signal and, therefore, can be added to the receiver with little or not modifications. Conventional blind techniques have the shortcoming that the receiver can generally not distinguish the desired signal from interference, and therefore the combiner weights can adapt to either the desired signal or to another wireless user's signal. Signal combining techniques typically achieve better performance than the selection diversity antenna approaches at the expense of added implementation complexity.

Another known approach to achieve performance improvement is through equalization, either in the time or frequency domain. In this technique, the multipaths arriving at the receiver are delayed, phase shifted, and amplitude scaled before they are combined (equalized). Equalization typically works better when the delay spread is large (>100 ns). The performance enhancement as a result of equalization adds to the diversity gain of antennas.

U.S. Pat. Nos. 4,736,460 and 4,797,950 describe a multipath reduction system including a CMA adaptive array. The CMA adaptive array includes at least two antenna elements and weighting means coupled to the antenna elements for selectively weighting the received signals by a selected weight factor. The weighted signals are added together to generate an adaptive array output signal. An envelope detector receives the adaptive array output signal for generating an amplitude envelope output signal of the adaptive array output signal. A multiplier receives the amplitude envelope output signal for generating a feedback signal. The feedback signal is received at CMA adaptive array for automatically redefining the weight factors based on the feedback signal and corresponding weighting means input signal. The use of CMA algorithm as described above has problems distinguishing the desired signal from the interfering signals.

Another conventional blind weight generation method is a power inversion technique, which generates weights that suppress the strongest received signals. This technique is acceptable when the interfering signals are much stronger than the desired signal. However, the desired signal can also be suppressed if stronger interfering signals are not present. Accordingly, neither of these techniques (CMA or power inversion) is suitable for MMSE weight generation in WLANs when interference is present.

U.S. Pat. No. 5,887,038 describes an adaptive array using a composite signal of weighted average of a coherent reference signal value and a constant modulus reference signal value. This technique also has problems distinguishing the desired signal from interfering signals.

It is desirable to provide an enhanced wireless communication system that employs multiple antenna elements and optimal adaptive signal processing techniques to provide an increase in operating range in a multipath environment while providing compatibility with existing wireless communication systems using blind weight adaptation.

SUMMARY OF THE INVENTION

The present invention employs multiple antenna elements and signal combining techniques to achieve both antenna diversity and combining gain. To realize the maximum achievable diversity gain, the received signals at the antenna elements need to experience independent fading. Typically, the signal correlation between any pair of antenna elements needs to be less than 0.5 for interference suppression and 0.7 for diversity gain with less than a 1 dB loss in performance as compared with uncorrelated fading. The present invention can apply, but is not restricted to, spatially diversity, polarization diversity, angular diversity, or pattern diversity. The diversity gain that can be achieved increases with the number of antenna elements. The increase in diversity gain is not a linear function of the number of antenna elements. The incremental diversity gain decreases as the number of antenna elements increases. Accordingly, most of the diversity gain is achieved with first few antenna elements.

The present invention provides a method and system for operating a wireless communication system in which received signals from a plurality of antennas are weighted and combined with a beam forming operation to form an output signal. The beam forming operation determines weights adjusted to increase a desired signal power in the output signal while reducing the power in the output signal of out-of-band components.

In an embodiment of the present invention, beam forming operations are performed with maximal ratio combining (MRC). Alternatively, a constant modulus algorithm (CMA) can be used for beam forming operations.

In an alternate embodiment, improved interference suppression is performed with a novel algorithm referred to as an interference nulling algorithm (INA). The INA receives an error signal which is 180° out of phase with a combination of the channels for individual antennas, referred to as the SUM channel. The error signal is determined by complex conjugate multiplication of the individual signals and a reference complex signal. It is desirable to simultaneously achieve diversity and combining gain and suppress the adjacent channel by combining the weight generation for MRC and that for INA, as described above, to generate antenna weights similar to those of MMSE combining.

In an embodiment of the present invention, the antenna weight is implemented using a modulator. The modulator uses two baseband control signals to create phase shift and amplitude scaling in the signal. In contrast, conventional approaches use a phase shifter and variable gain amplifier. An advantage of the present invention is that the baseband control signals can be directly obtained from processing without the needs for converting the two signals into phase shift and amplitude scaling.

In the present invention, the antenna weights and combining are performed at the RF frequency, RF combining, instead of at the baseband. Accordingly, in an embodiment of the present invention, a beam former is located between the antenna and the receiver/transmitter interface. RF combining simplifies the interface between the beam former and the transmitter/receiver. Typically, this interface is the same for most vendors whereas the baseband interface differs from vendors to vendors. Accordingly, the approach of the present invention enables beam former processing to be compatible with most vendors.

In an embodiment of the present invention, an antenna weight magnitude control loop is used to maintain the magnitude of the antenna weight. Accordingly, the receiver sensitivity can be maintained and the circuit will not saturate.

The present invention provides substantial increase in operating range in a multipath-rich environment; an adaptive antenna null formation, which suppresses the interference arriving from directions other than the desired signal; a reduced deployment effort; cost effectiveness; power efficiency; process, temperature, component variation insensitivity; compactness; fast convergence; and compatibility with existing WLAN systems by exploiting the spatial and polarization antenna diversity, optimal signal combining, and blind weight adaptation.

The invention will be more fully described by reference to the following drawings.

DETAILED DESCRIPTION

Figure 1:
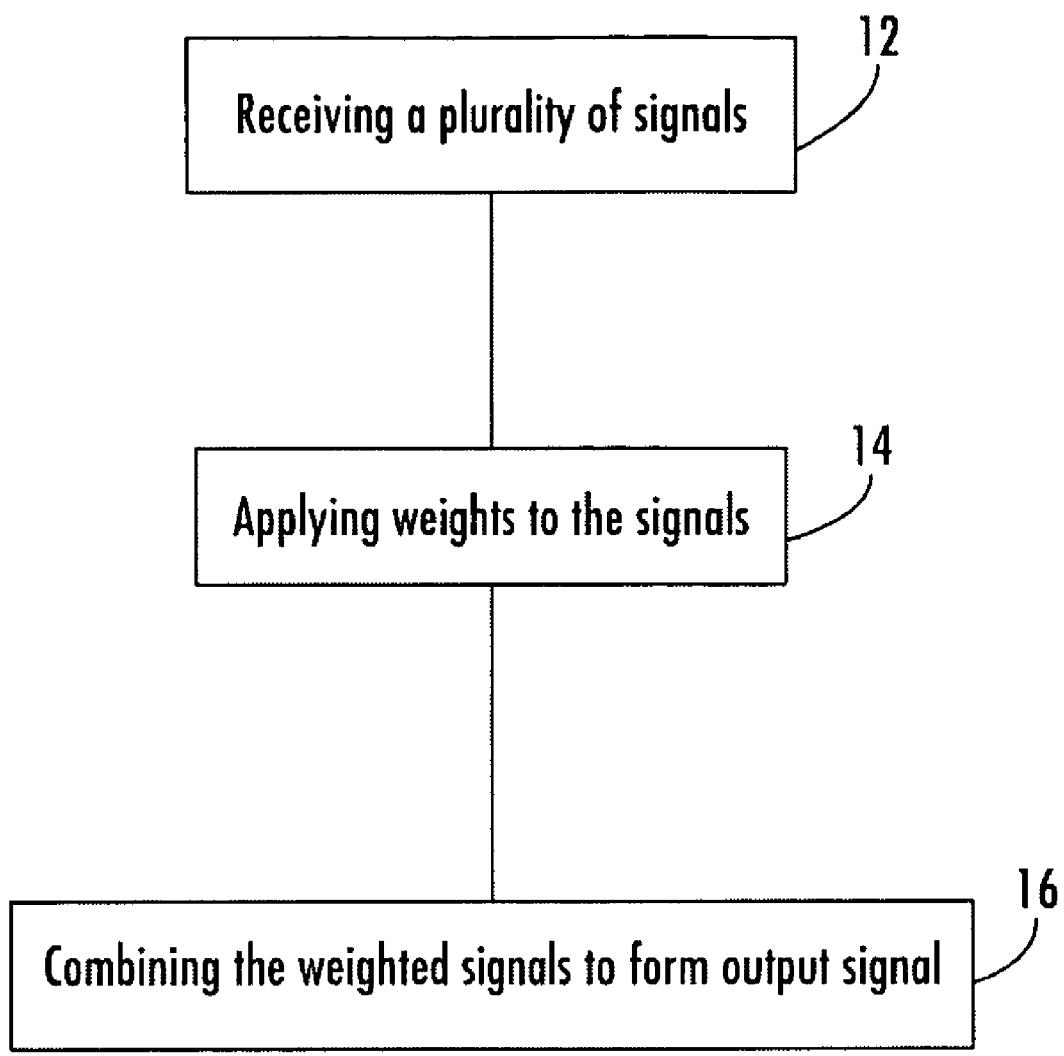
FIG. 1 is a flow diagram of a method for processing a plurality of received signals in a wireless communication system.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow diagram of a method for operating a wireless communication beam forming receiver 10 in accordance with the teachings of the present inventions. In block 12, a plurality of signals are received by the wireless communication receiver. In block 14, weights are applied to the plurality of signals. In block 16, the weighted signals are combined to form an output signal. The weights used in the weighting step are adjusted to increase power in output signal of in-band components and decrease power in the signal out-of-band components.

Figure 2:
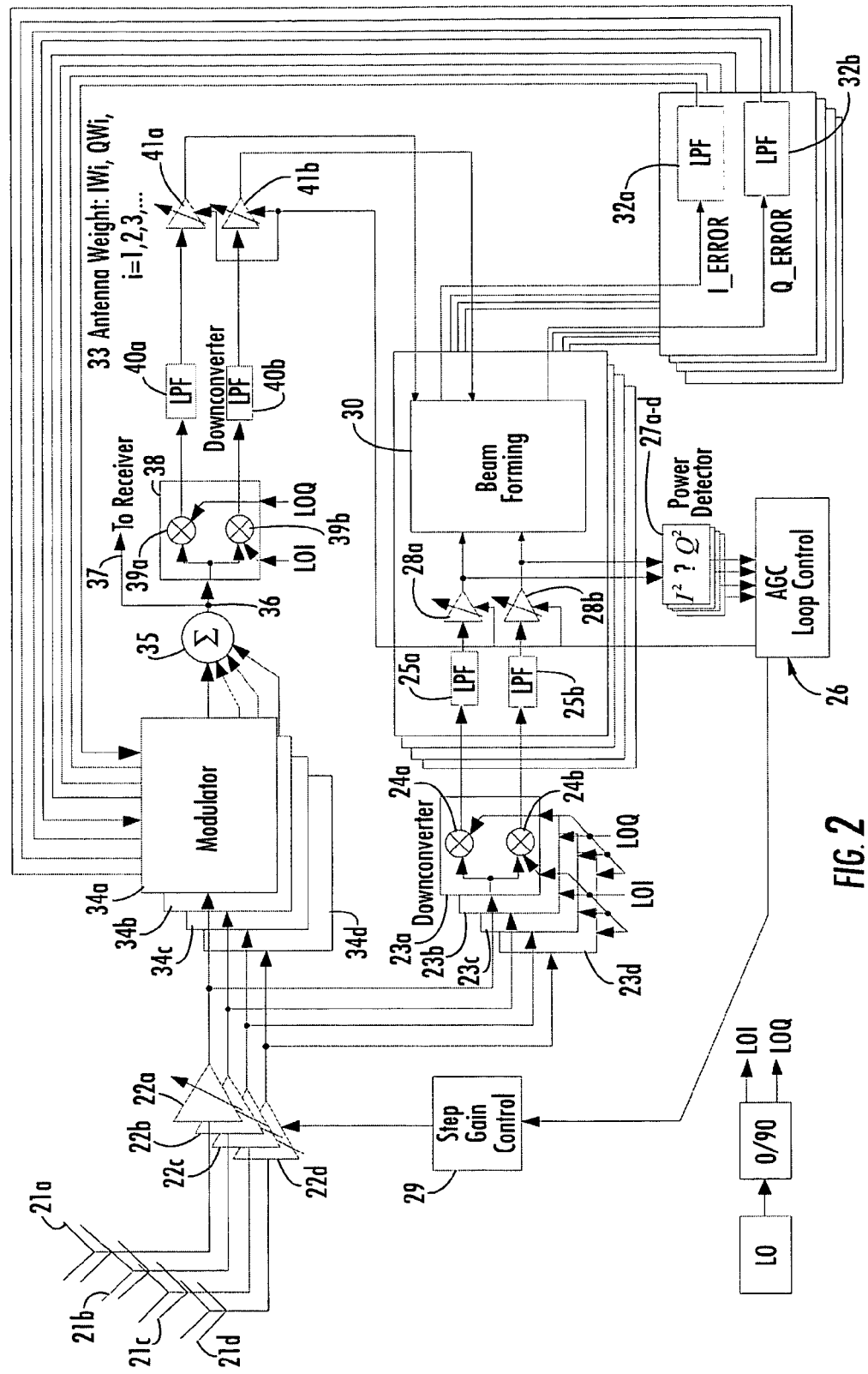
FIG. 2 is a schematic diagram of a receive beam forming system including a closed-loop implementation of maximal ratio combining (MRC).

FIG. 2 is an illustration of wireless receive beam forming system including closed loop implementation of MRC for performing the method shown in FIG. 1. Within wireless receive beam forming system 20 is a plurality of antennas 21a-d and along which wireless receive beam forming system 20 may receive (or transmit) signals. The signals are amplified in amplifiers 22a-d. The outputs of amplifiers 22a-d are downconverted in respective downconverters 23a-d. Each of downconverters 23a-d multiplies the output of respective amplifiers 22a-d by local oscillator inphase signal (LOI) and a local oscillator quadrature phase signal (LOQ) in respective multipliers 24a-b. It will be appreciated that various numbers of antennas and processing elements could be used in accordance with the teachings of the present invention.

The resultant signals are applied to respective low pass filters (LPF) 25a, 25b in a baseband automatic gain control (AGC) loop 26 that normalizes the signal level before the MRC algorithm. AGC loop 26 provides consistent performance of wireless receive beam forming system 20 at different input signal levels. Variable gain amplifiers 28a, 28b are applied to respective output of LPF 25a, 25b and MRC beam forming module 30. At the output of variable gain amplifiers 28a, 28b, power detectors 27 are applied to add the signal power of all antennas and compare the signal power to a threshold value. The difference between the signal power of all antennas and the threshold value can be integrated to maintain the signal level after AGC loop 26 at the same level and can be used to adjust the gain of variable gain amplifiers 28a, 28b. Accordingly, in this implementation, the MRC algorithm is able to work at different input signal levels.

In an embodiment of the present invention, in addition to baseband AGC loop 26, RF step gain control 29 can be incorporated to adjust for a large signal dynamic range. [Control of the RF step gain control 29 can be derived from power detectors 27a-d. RF step gain control 29 switches the amplifier gain (or loss) of amplifiers 22a-d when input the signal level received from antennas 21a-d is high and larger than a predetermined value to prevent the RF frontend from entering into saturation.

MRC beam forming module 30 performs real time adaptive signal processing to obtain the maximum signal-to-noise ratio. In an implementation of MRC beam forming module 30 the antenna weights are used to align the phases of four antenna signals received from antennas 21a-d to the same phase and also scale the signal in proportion to the square-root of the signal-to-noise ratio in each individual channel. In one implementation, the signal envelope is used as an approximation to scale the signal in proportion to the square-root of the signal-to-noise ratio in each individual channel.

Figure 3:
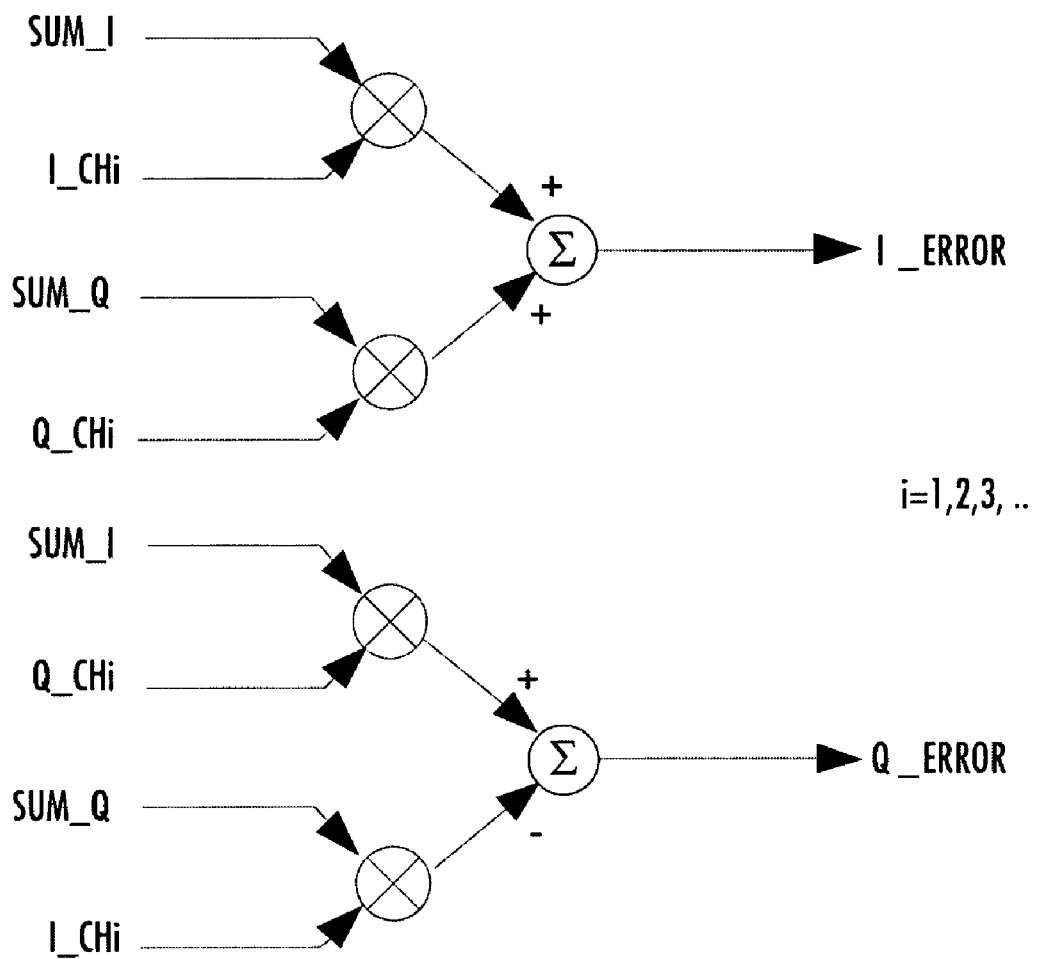
FIG. 3 is a schematic diagram of an implementation of a beam forming module.

MRC beam forming module 30 can employ a Cartesian feedback loop, as shown in FIG. 3. MRC beam forming module 30 provides baseband processing which performs complex conjugate multiplication of the output of a baseband I and Q channel filter with a baseband reference I and Q channel as follows:

$$I\_ERROR_i = I_i * I_s + Q_i * Q_s$$

$$Q\_ERROR_i = I_i * Q_s - Q_i * I_s$$

The resultant signal ($I\_ERROR_i$, $Q\_ERROR_i$) at the output of MRC beam forming module 30 is a complex signal with phase equal to the difference of the reference complex signal and the individual signal and an envelope proportional to the envelope of the individual signal. Signal $I_{13}$ ERROR is applied to low pass filter (LPF) 32a and signal Q_ERROR is applied to low pass filter (LPF) 32b. The output of the (LPF) 32a, 32b is antenna weight 33 (IWi, QWi, i=1,2,3,4). The antenna weights and combining are performed at RF frequency.

The outputs of amplifiers 22a-d are applied to respective modulators 34a-d and are each multiplied by antenna weight 33. Accordingly, the antenna weight is implemented using a modulator in which the baseband central signals are used to create phase shift and amplitude scaling in the signal without the use of a phase shifter and variable gain amplifier. The outputs of modulators 34a-d are combined in summer 35 to generate combined output signal 36. Combined signal 36 is forwarded to receiver 37.

Combined signal 36 is applied to downconverter 38 and is multiplied by LOI and LOQ in respective multipliers 39a, 39b. The resultant signals are applied to low pass filters (LPF) 40a, 40b. Output from low pass filters (LPF) 40a, 40b are amplified with quadrature phase signal amplifiers 41a, 41b and is applied to MRC beam forming module 30 to be used for updating antenna weight 33, as described above.

It has been found that if the antenna weight setting produces a combined signal which is small in magnitude, the antenna weight thus derived can be small in magnitude, leading to a smaller set of weights. The combined signal thus derived can become small and can be indistinguishable from circuit noise. The receiver noise figure degrades significantly. Also, if the initial weight produces a combined signal which is large in magnitude, the antenna weight thus derived leads to large set of weights resulting in a larger combined signal which can saturate the circuit to generate the antenna weight and the RF modulator. Accordingly, it is desirable to provide an algorithm to maintain the antenna weight magnitude control. In one embodiment, a weight magnitude control loop 40 is added to the closed loop MRC implementation shown in FIG. 2.

Figure 4:
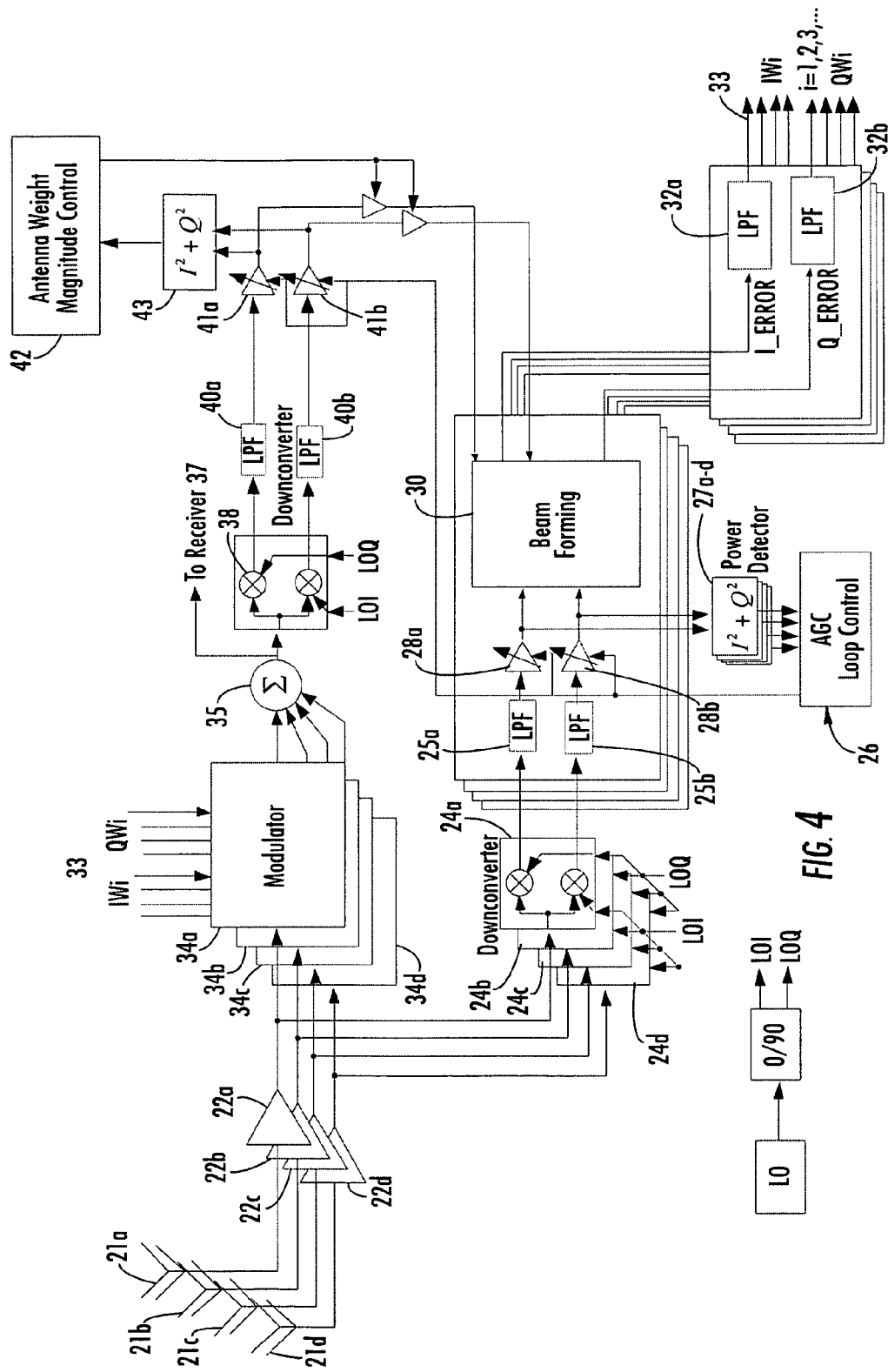
FIG. 4 is a schematic diagram of a receive beam forming system including a closed loop MRC implementation with antenna weight magnitude control.
Figure 5:
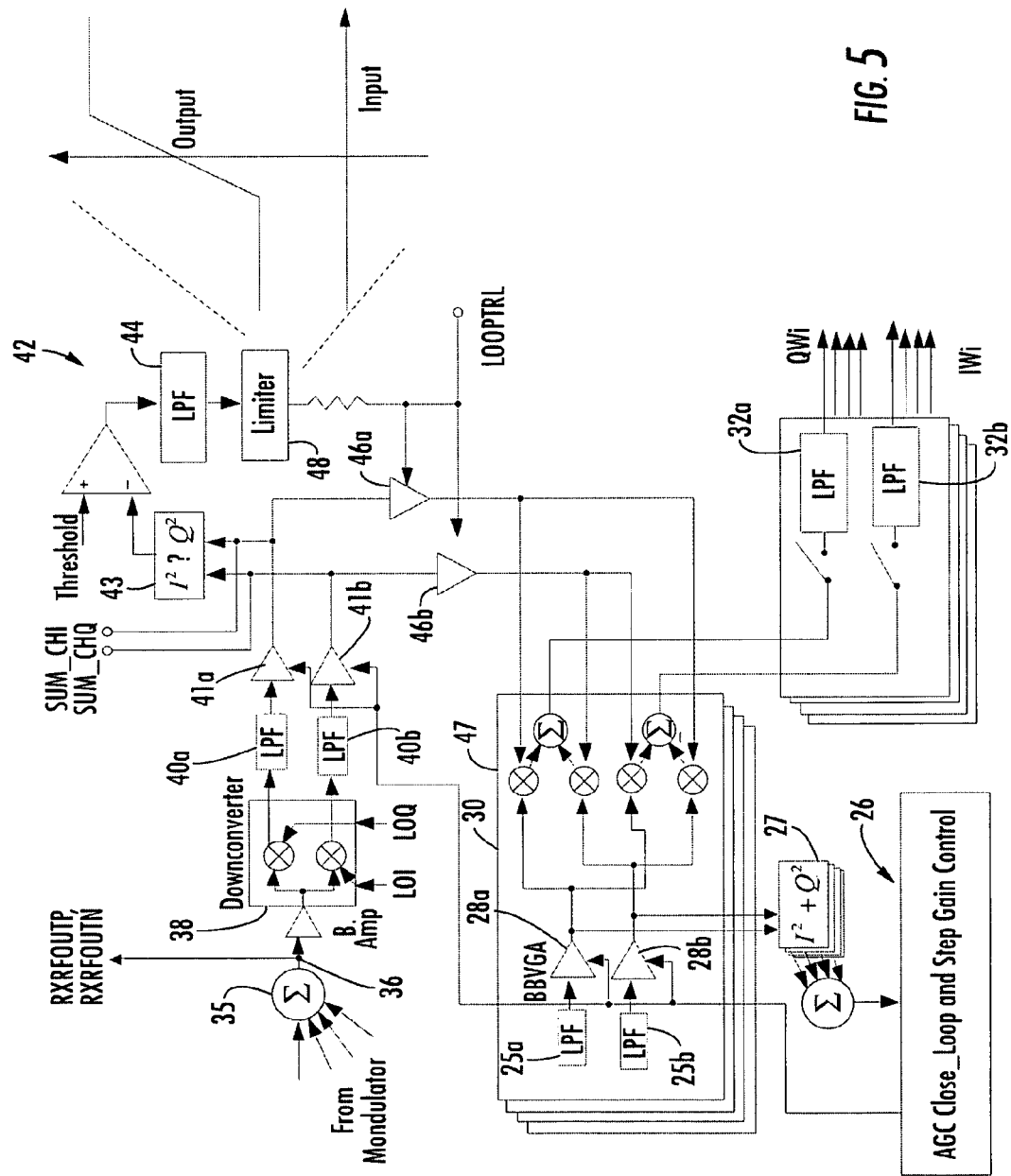
FIG. 5 is a schematic diagram of an implementation of the antenna magnitude weight control loop in the receive beam forming system shown in FIG. 4.

FIG. 4 illustrates a receive beam forming system implementing closed loop MRC with antenna weight magnitude control. As shown in FIG. 4, antenna weight magnitude control loop 42 monitors the power in the combined signal. If the magnitude of the weight is small, the power of the combined signal is small. Alternatively, if the magnitude of the weight is large, the power of the combined signal is large. Power detector 43 of antenna weight magnitude control loop 42 compares the power of combined signal 36 with a threshold level. The difference between the power of combined signal 36 and the threshold level is filtered with low pass filter (LPF) 44, shown in FIG. 5. The filtered output is fed forward to variable gain amplifiers 46a, 46b to adjust the magnitude of the combined signal. The output of variable gain amplifiers 46a, 46b is used in correlators 47 of MRC beam forming module 30 to derive the antenna weights (IW$_i$, QW$_i$, i=1, 2, 3 . . . ) 33. A higher gain in variable gain amplifiers 46a, 46b produces a larger antenna weight and a lower gain in variable amplifiers 46a, 46b produces a smaller antenna weight. By varying the gain of variable gain amplifiers 46a, 46b in the baseband SUM channel signal paths, the magnitude of the antenna weight is adjusted to a proper level.

As the 802.11 WLAN signal has short preamble, it is desirable that the beam forming operation is accomplished at the beginning of the signal preamble. For example, in 802.11b, it is desirable that the beam forming operation converges within about the first 20 microseconds. For example, in 802.11a/g, it is desirable that the beam forming operation converges within about the first 2 microseconds. To achieve a fast beam forming operation, the LPF bandwidth and the bandwidth of the antenna weight magnitude control loop 42 should be wide. Wider loop bandwidth can lead to excessive fluctuations in the antenna weights. Limiter 48 is used to limit antenna weight fluctuations. Limiter 48 reduces weight fluctuation while maintaining a wide loop bandwidth in the antenna weight magnitude control loop 42.

A weight generation implementation that can simultaneously reject the interference signal and achieve diversity and combining gain is known as the Constant Modulus Algorithm (CMA). The Constant Modulus Algorithm (CMA) can be used for a class of signals with constant or near constant envelope. The algorithm for closed-loop implementation based on discrete time implementation of the CMA is $$J(\underline{w}) = E\{||\underline{w}^H \underline{r}| - A|^2\}$$

$$\underline{w}_{i+1} = \underline{w}_i - \mu \cdot \nabla J(\underline{w})$$

$$\underline{w}_{i+1} = \underline{w}_i - \mu \cdot \underline{r} e^*$$

where $$e = \left(x - A \frac{x}{|x|}\right)$$

and $$x = \underline{w}^H \underline{r}$$

wherein A specifies the desired magnitude of the combined signal, the superscript * denotes the complex conjugate, $\mu$ is the gain factor for the algorithm which controls the convergence speed of the loop, r is the receive signal and the x is the combined signal which also serves as the reference signal of the loop.

Figure 6:
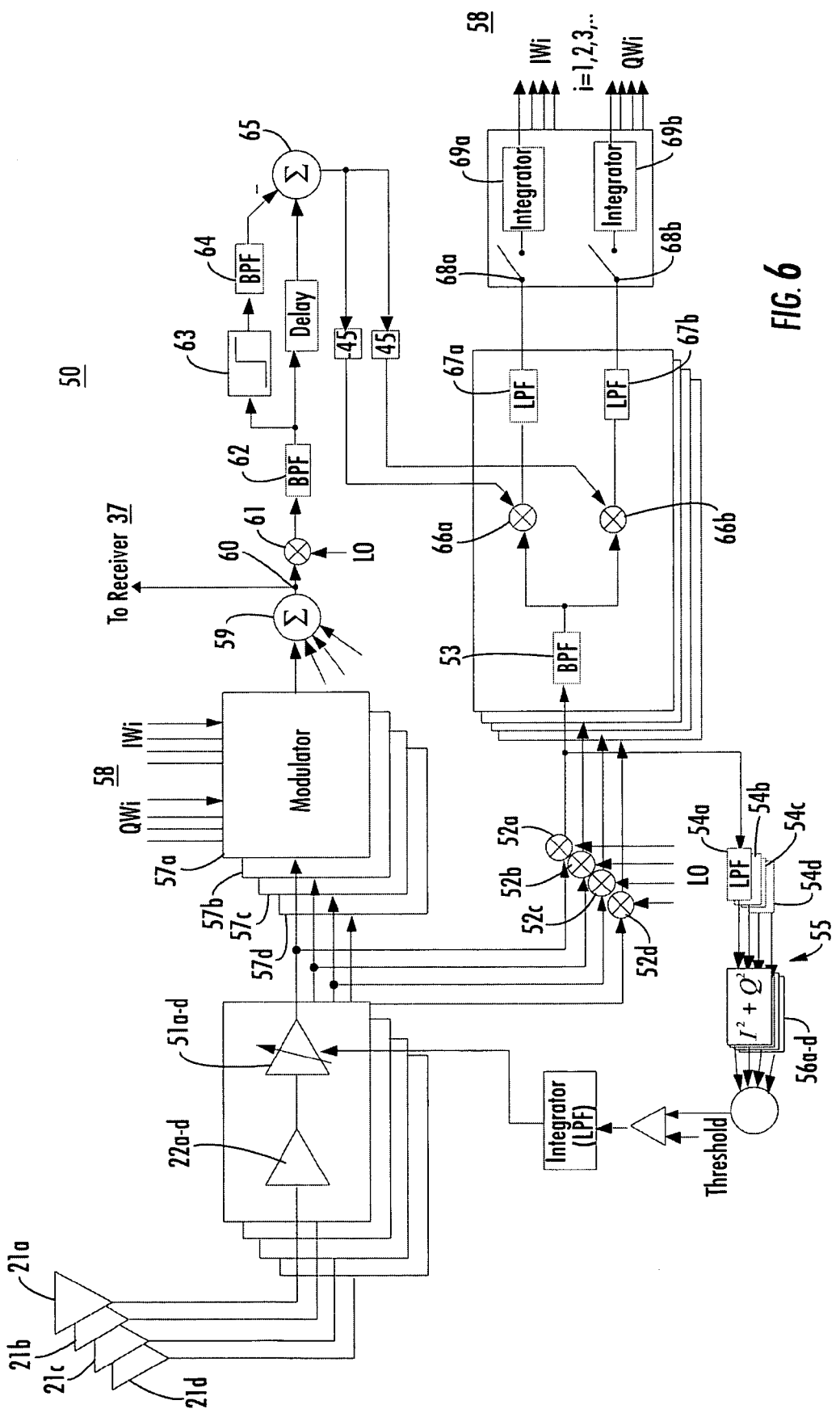
FIG. 6 is a schematic diagram of a receive beam forming system including a constant modulus algorithm (CMA) implementation using a bandpass limiter.

Typically, both noise and interference can increase the fluctuations in signal envelope. Using the CMA to keep the signal envelope constant can simultaneously suppress noise and interference. Accordingly, CMA can be used to realize the antenna combining and diversity gain similar to the MRC implementation described above. FIG. 6 illustrates an embodiment of the present invention of a receive beam forming system implementing the CMA with a bandpass limiter. In this embodiment, the combined signal envelope fluctuation is first removed to produce a reference constant envelope waveform x/|x|. Within wireless receive beam forming system 50 is a plurality of antennas 21a-d along which wireless receive beam forming system 50 may receive (or transmit) signals. The signals are amplified in amplifiers 22a-d and variable gain amplifiers 51a-d. The outputs of variable gain amplifiers 51a-d are multiplied in respective multipliers 52a-d by local oscillator signal (LO). The outputs of multipliers 52a-d are applied to bandpass filter 53. An output of multipliers 52a-d is also applied to low pass filters 54a-d in automatic gain control loop 55. Control of automatic gain control loop 55 can be derived from the sum of power detectors 56a-d to switch the amplifier gain or loss of variable gain amplifiers 51a-d.

The outputs of variable gain amplifiers 51a-d are applied to modulators 57a-d and are each multiplied by antenna weight 58 (IWi, QWi, i=1, 2, 3, 4). The outputs of modulators 57a-d are combined in summer 59 to generate combined signal output 60. Combined signal output 60 is multiplied by local oscillation signal LO in multiplier 61. The resultant signal is applied to band pass filter 62 to convert the combined signal to an intermediate frequency. The signal is then passed through bandpass limiter 63 and bandpass filtered in bandpass filter 64 to remove the higher order harmonics produced by the bandpass limiting process. Bandpass limiter 63 removes the envelope fluctuations in the reference signal. Bandpass limiter 63 processes the received signal at IF frequency. As the signal passes through bandpass limiter 63, the signal experiences group delay. A delay element provides the same amount of delay in the direct path and the delay is combined with the signal from bandpass limiter 63 in summer 65. The resultant signal is multiplied by 45, −45 and the output of bandpass filter 53 in multipliers 66a, 66b. Output from multipliers +66a, 66b is filtered with low pass filters 67a, 67b and applied using representative switches 68a, 68b to integrators 69a, 69b to generate antenna weights 58 (IW$_i$, QW$_i$).

Figure 7:
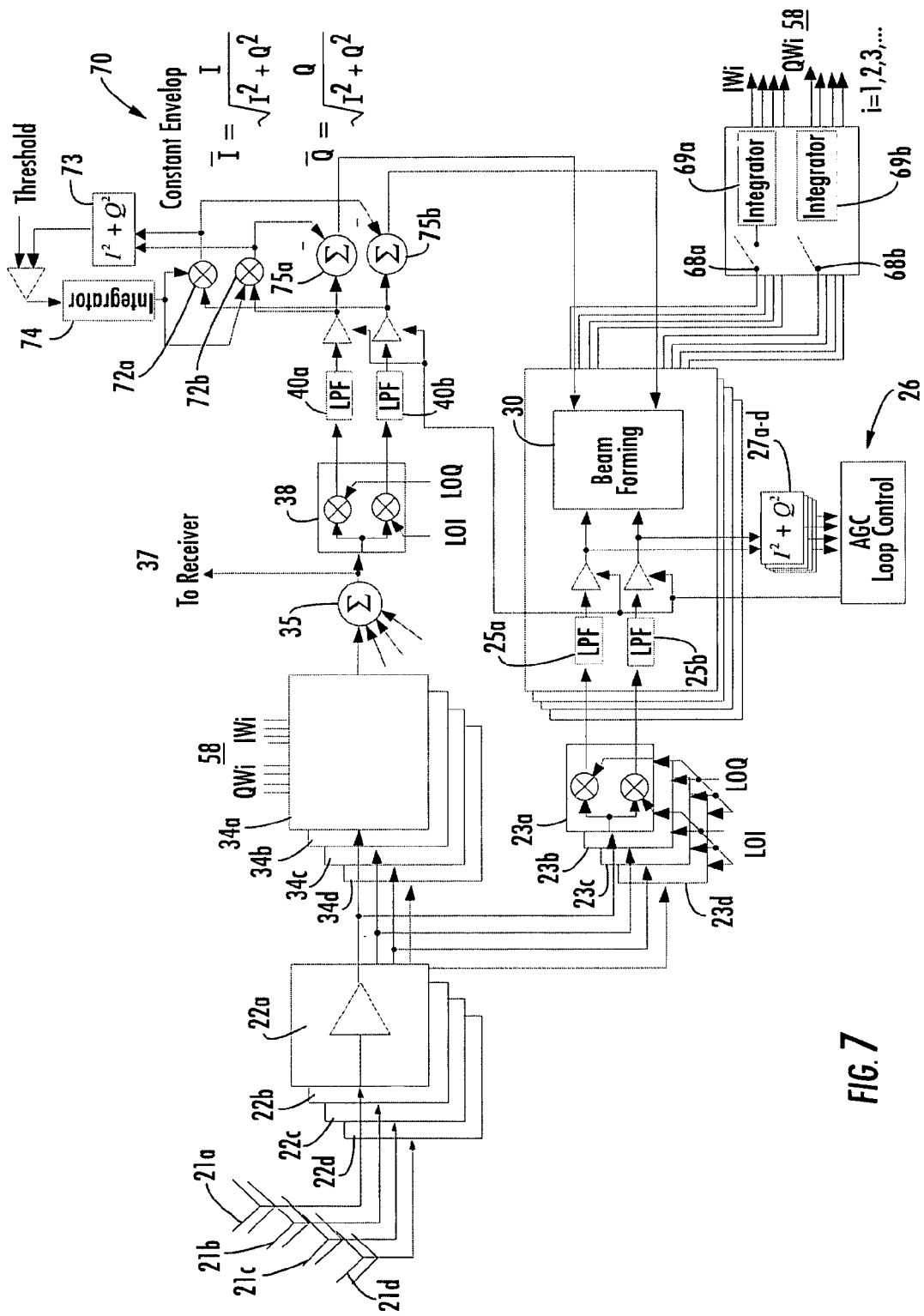
FIG. 7 is a schematic diagram of a receive beam forming system including a CMA implementation using an automatic gain control (AGC) loop.

In an alternate embodiment, implementation for CMA an automatic gain control (AGC) loop 70 is used to remove the fluctuation in the signal envelope, as shown in FIG. 7. In order to remove very fast signal envelope fluctuations, the closed-loop bandwidth of AGC loop 70 must be comparable to the signal bandwidth. The wider AGC loop 70, the noisier the loop will be. In the presence of the channel loop, AGC loop 70 approach will produce a noisy reference waveform and affects the performance of the CMA algorithm. Multipliers 72a-b apply respective constant envelope values $$\bar{I} = \frac{I}{\sqrt{I^2 + Q^2}}$$

and $$\bar{Q} = \frac{Q}{\sqrt{I^2 + Q^2}}$$

to combined output from LPF 40a-40b and AGC control loop 26. Power detector 73 adds the output of multipliers 72a-d and compares the signal power to threshold value. The difference between the signal power and the threshold value is integrated in integrator 74 to remove fluctuations in the signal envelope and summed in respective summer 75a-b. The resultant signal is applied to MRC beam forming module 30. Output of MRC beam forming module 30 is applied using respective switches 68a, 68b to integrators 69a, 69b to generate antenna weight 58 (IW$_i$, QW$_i$). For a class of phase-modulated single carrier signal having the constant envelope property, the fluctuations in the signal envelope are inversely proportional to a width of the signal spectrum.

802.11b specifications allows for overlapping channels. Specifically, the 2.4 GHz ISM band of 86 MHz is split into 11 overlapping channels, each separated by only 5 MHz. Only three non-overlapping channels can operate simultaneously in close proximity (generally, channels 1, 6, and 11 are used). Accordingly, with interference suppression, all 11 channels could be used, potentially increasing the system capacity approximately 4-fold.

Figure 8:
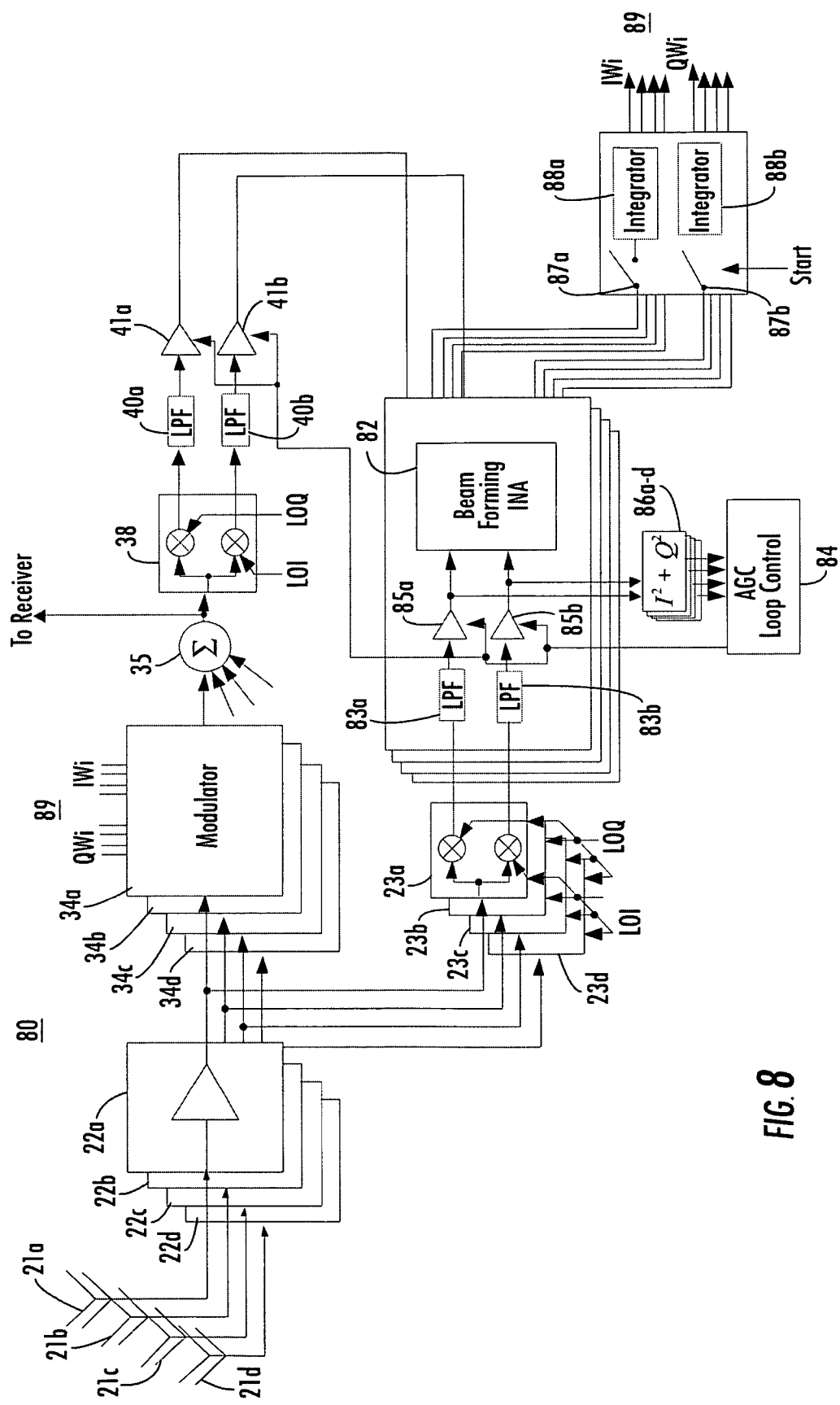
FIG. 8 is a schematic diagram of a receive beam forming system including an interference nulling algorithm (INA) implementation.

FIG. 8 is an embodiment of a wireless receive beam forming system 80 implementing an interference nulling algorithm (INA) for providing improved interference suppression for performing the method shown in FIG. 1. In general, the interference nulling algorithm (INA) is summarized in the following:

$$J(w) = E\{\|w^H r\|^2\}$$

$$w_{i-1} = w_i - \mu \cdot \nabla J(w)$$

$$w_{i-1} = w_i - \mu \cdot r x^*$$

where K $x = w^H r$

The implementation of INA provides that the received signal from individual antennas 21a-d and is correlated with the desired signal in INA beam forming module 82. Before INA beam forming module 82, the resultant signals of antennas 21a-d are applied to respective low pass filters (LPF) 83a, 83b in a baseband automatic gain control (AGC) loop 84 that normalizes the signal level before the INA algorithm. AGC loop 84 provides consistent performance of wireless receive beam forming system 80 at different input signal levels. Variable gain amplifiers 85a, 85b are applied to respective output of LPF 83a, 83b and output of AGC loop 84. At the output of variable gain amplifiers 85a, 85b power detectors 86a-d and are applied to add the signal power of all antennas and compare the signal power to a threshold value. The difference between the signal power of all antennas and the threshold value can be integrated to maintain the signal level after AGC loop 84 at the same level and can be used to adjust the gain of variable gain amplifiers 85a, 85b. Accordingly, in this implementation, the INA is able to work at different input signal levels. The resultant error signal is applied by switches 87a, 87b to integrators 88a, 88b and is integrated before it is fed back as antenna weight (IW$_j$, QW$_j$) 89.

The basic principle of the operation in INA beam forming module 82 is to derive an error signal (i.e., $-\mu \cdot r x^*$) which is 180 degrees out of phase with a combination of the channels from the individual antennas 21a-d, referred to as the SUM channel (i.e., $x = w^H r$). When the error signal is added (integrated) into the antenna weight, it acts to reduce the strength of the SUM channel, thereby canceling the interference signal. As the SUM channel magnitude becomes smaller and smaller, the error signal also becomes smaller and eventually reaches a steady state solution for the antenna weight and continues to adapt to the interference signal as it changes. The weights can be generated to combine the signals received from antennas 21a-d to increase gain and suppress interference, permitting operation even with noise and/or interference power that is greater than signal power.

It is desirable to simultaneously achieve diversity and combining gain and suppress the adjacent channel by combining the weight generation for MRC and that for INA, as described above, to generate antenna weights similar to those of MMSE combining. An implementation that is compatible with MRC and adjacent channel interference nulling can be derived as follows:

$$^*\text{Reference waveform } \frac{x}{\sqrt{P_x}}$$

$$\underline{w}_{MRC} = \frac{\underline{r}}{\sqrt{\underline{r}^H \cdot \underline{r}}} \cdot \frac{x^*}{\sqrt{P_x}}, \quad x_{MRC} = \underline{w}_{MRC}^H \cdot \underline{r}$$

$$J(w_j) = E\{|\underline{w}^H \cdot \underline{r} - \underline{w}_{MRC}^H \cdot \underline{r}|^2\}$$

$$e_i = (x_i - \underline{w}_{MRC}^H \underline{r})$$

$$\underline{w}_{MRC,i+1} = \underline{w}_{MRC,i} + \mu \cdot \frac{\underline{r}}{\underline{r}^H \cdot \underline{r}} \cdot (x_i - \underline{w}_{MRC}^H \underline{r})^*$$

where power$_x$ is the filtered waveform of the instantaneous power of x In the above derivation, the reference waveform used is the combined signal divided by the square root of its power. Using the reference waveform, a set of weights 97 (QW$_i$, IW$_i$) that achieve the MRC criterion can be obtained. If it is assumed that the total received signal power from all antenna elements is constant, the error signal can be derived as:

$$e_i = (x - \underline{w}_{MRC}^H \underline{r})$$

$$= \left(x - \frac{A}{\sqrt{P_x}} \cdot x\right)$$

The algorithm is in a form that is compatible to the implementation of the INA. In the above algorithm, since the received signal power P$_x$ is not known a priori, it can be estimated by filtering the instantaneous signal power (x*x) of the combined signal. The bandwidth of the filter is determined by the required convergence time of the MRC algorithm. In the above implementation, all signals are filtered by a channel filter.

Figure 9:
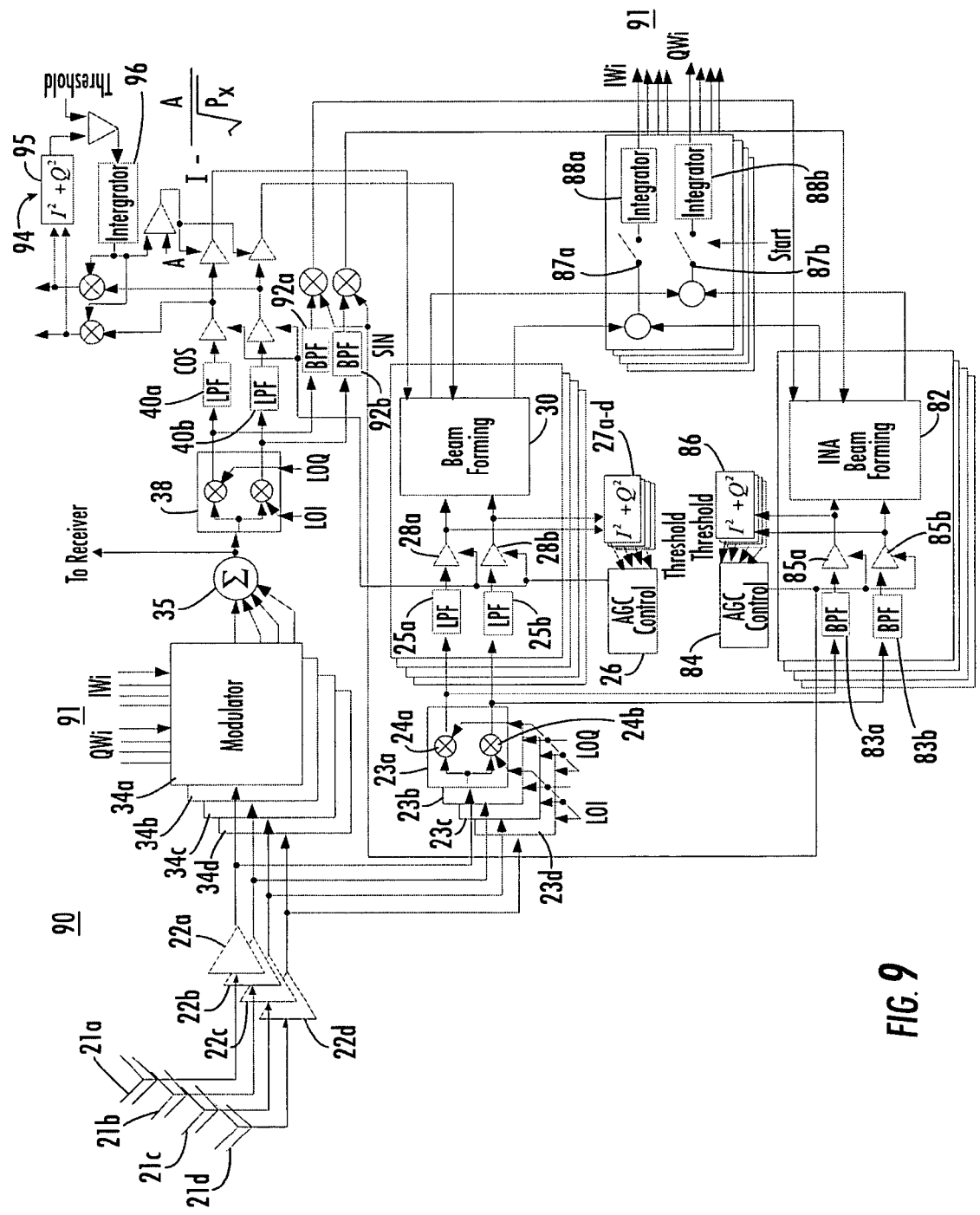
FIG. 9 is a schematic diagram of a receive beam forming system including a combined MRC and INA implementation.

A preferred embodiment of the above combined MRC and INA algorithm is illustrated in FIG. 9 as receive beam forming system 90 including a combined MRC and INA implementation. Receive beam forming system combines MRC beam forming module 30 and INA beam forming module 82 to generate antenna weight (IW$_j$, QW$_j$) 91. The downconverted signal of downconverter 38 from the combined signal of antenna 21 is split into two paths, one path is passed through LPF 40a, 40b and one path is passed through bandpass filters 92a, 92b. AGC loop 94 is used to normalize the signal magnitude. In AGC loop 94, the signal power from four channels are computed and added, the total power is then compared to a threshold in power detector 95. The error is then used to drive integrator 96 having an output which adjusts the signal amplitude.

AGC loop 94 is used to find the power of the summation channel and is used to compute the factor $$1 - \frac{A}{\sqrt{P_x}}.$$

The factor $$1 - \frac{A}{\sqrt{P_x}}$$

serves to regulate the magnitude of the antenna weight. The magnitude of $\sqrt{P_x}$ is affected by the magnitude of the antenna weight. When the antenna weight is at its nominal value, $\sqrt{P_x}$ should be at a nominal value of $\sqrt{P_{nom}}$. If the antenna weight is smaller than its nominal value, $\sqrt{P_x} < \sqrt{P_{nom}}$ or equivalently $$1 - \frac{A}{\sqrt{P_x}}$$

is larger than nominal value $$1 - \frac{A}{\sqrt{P_{nom}}},$$

the antenna weight is driven larger until it reaches the value $$1 - \frac{A}{\sqrt{P_{nom}}}.$$

If conversely $\sqrt{P_x} > \sqrt{P_{nom}}$, $$1 - \frac{A}{\sqrt{P_x}}$$

becomes smaller than the nominal value $$1 - \frac{A}{\sqrt{P_{nom}}},$$

the polarity of the error signal is thus reversed, driving the antenna weight toward canceling the combined signal and thereby reduces the antenna weight.

Figure 10:
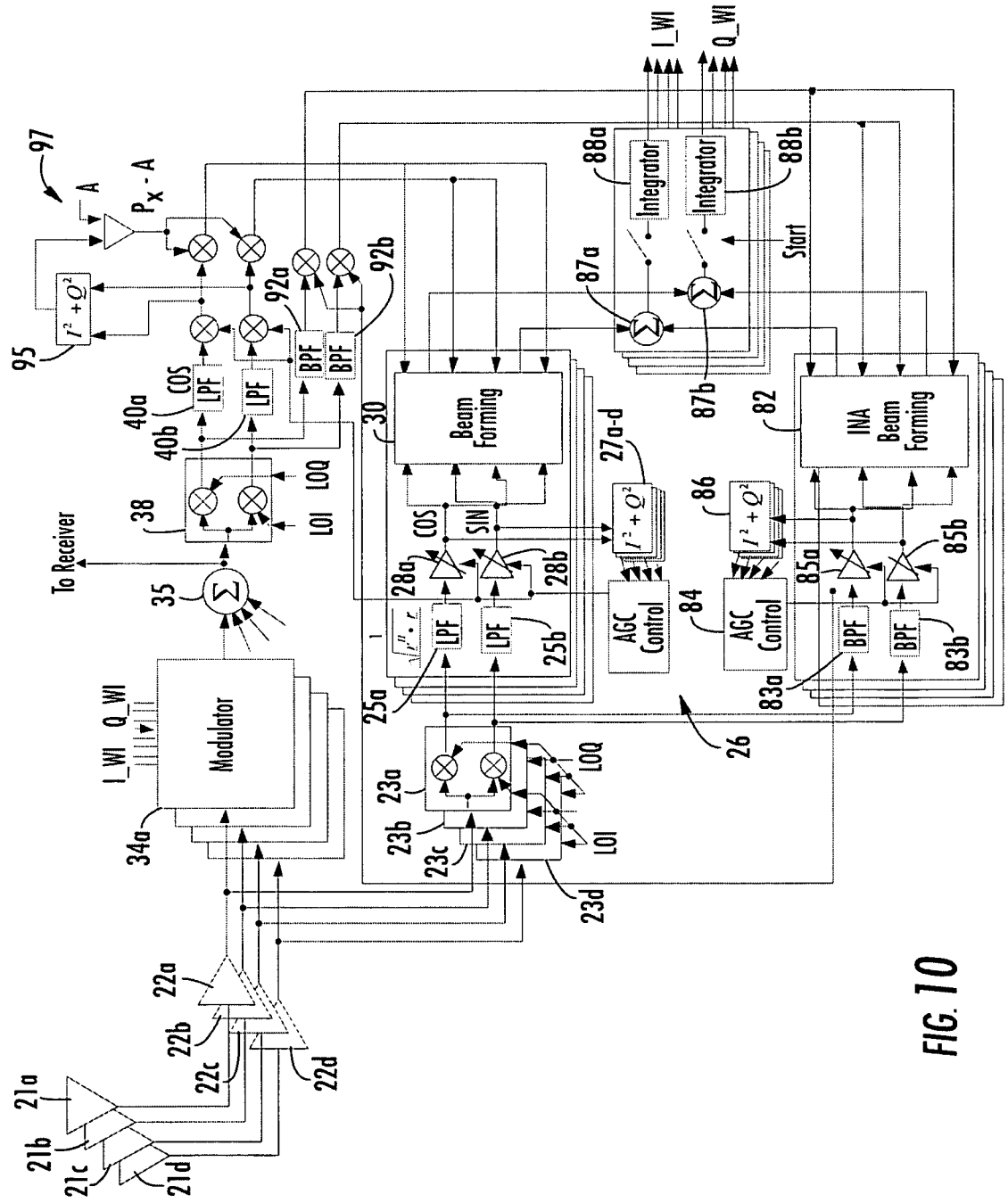
FIG. 10 is an alternate embodiment of a receive beam forming system including a combined MRC and INA implementation.

An alternate embodiment of a combined MRC and INA implementation is shown in FIG. 10. A simplification is achieved by replacing the factor $$1 - \frac{A}{\sqrt{P_x}}$$

by the factor of $\sqrt{P_x} - A$ in AGC loop 97. Accordingly, this implementation eliminates the closed loop operation to derive the factor $$\frac{A}{\sqrt{P_x}},$$

thereby eliminating the possibility of instability associated with implementing one closed loop operation inside another closed loop operation. The factor $\sqrt{P_x} - A$ serves to regulate the magnitude of the antenna weight following the similar operation as described above for $$1 - \frac{A}{\sqrt{P_x}}.$$

The conventional MRC algorithm provides the relative (not absolute) signal phases and the magnitude of the antenna weights. The combined MRC and INA implementation drives the relative signal phases and magnitude of the antenna weight toward the MRC and INA solution, and also controls the antenna weight. The interference suppression is performed at the RF beam forming combining so that the interference suppression can be accomplished even if the interference signal spectrum partially overlaps the signal spectrum of the desired signal.

Figure 11:
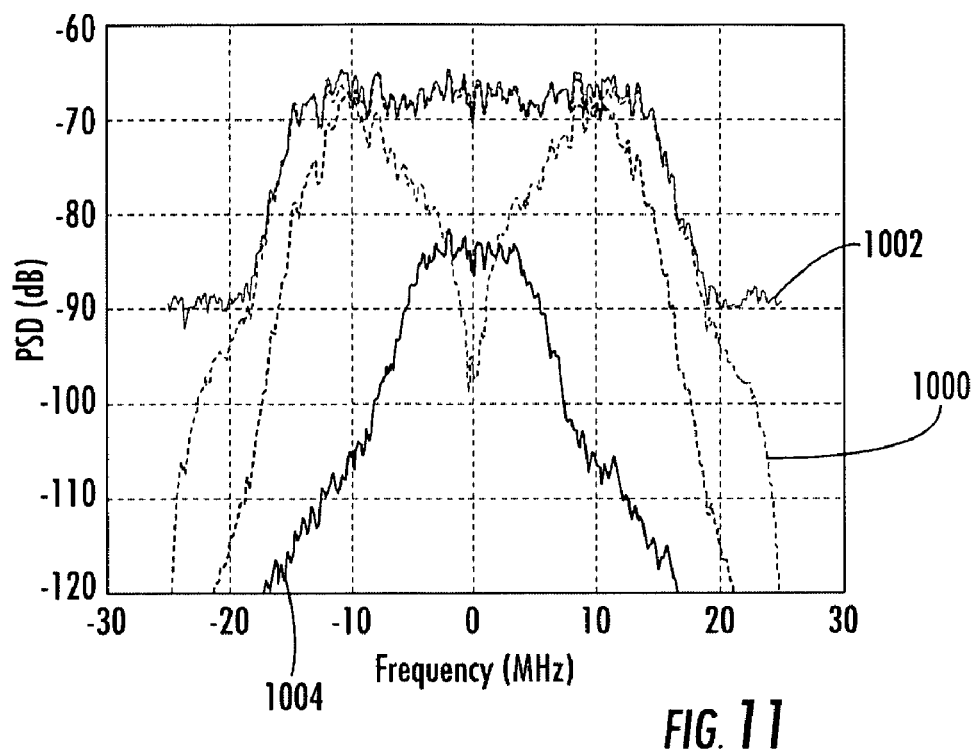
FIG. 11 is a graph of a signal spectrum before and after interference nulling.

FIG. 11 shows the spectrum of desired signal 1000 and two interference signals 1002 and the recovered signal 1004 after performing interference suppression.

Figure 12:
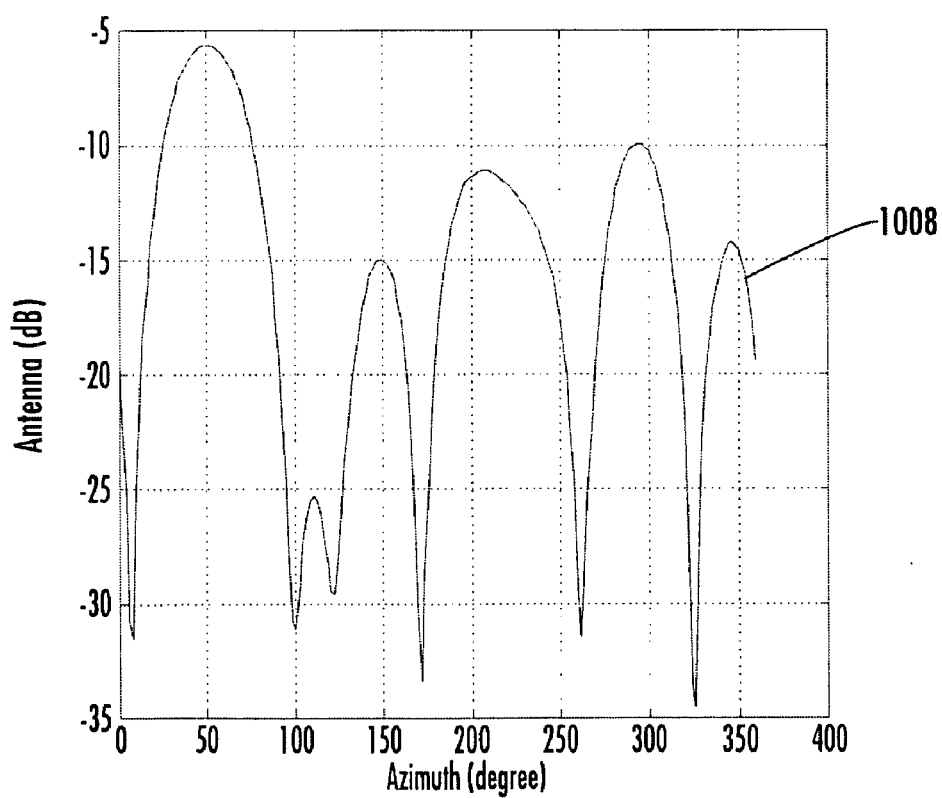
FIG. 12 is a graph of an antenna pattern after interference suppression.

FIG. 12 shows antenna pattern 1008 actually formed with the antenna weight derived from the implementation in FIG. 10. The antenna forms a beam toward the desired signal direction while forming a null toward the interference signal direction. This example assumes no multipath in order to be easier to visualize. It is noted that the algorithm is just as effective with multipath fading.

Figure 13:
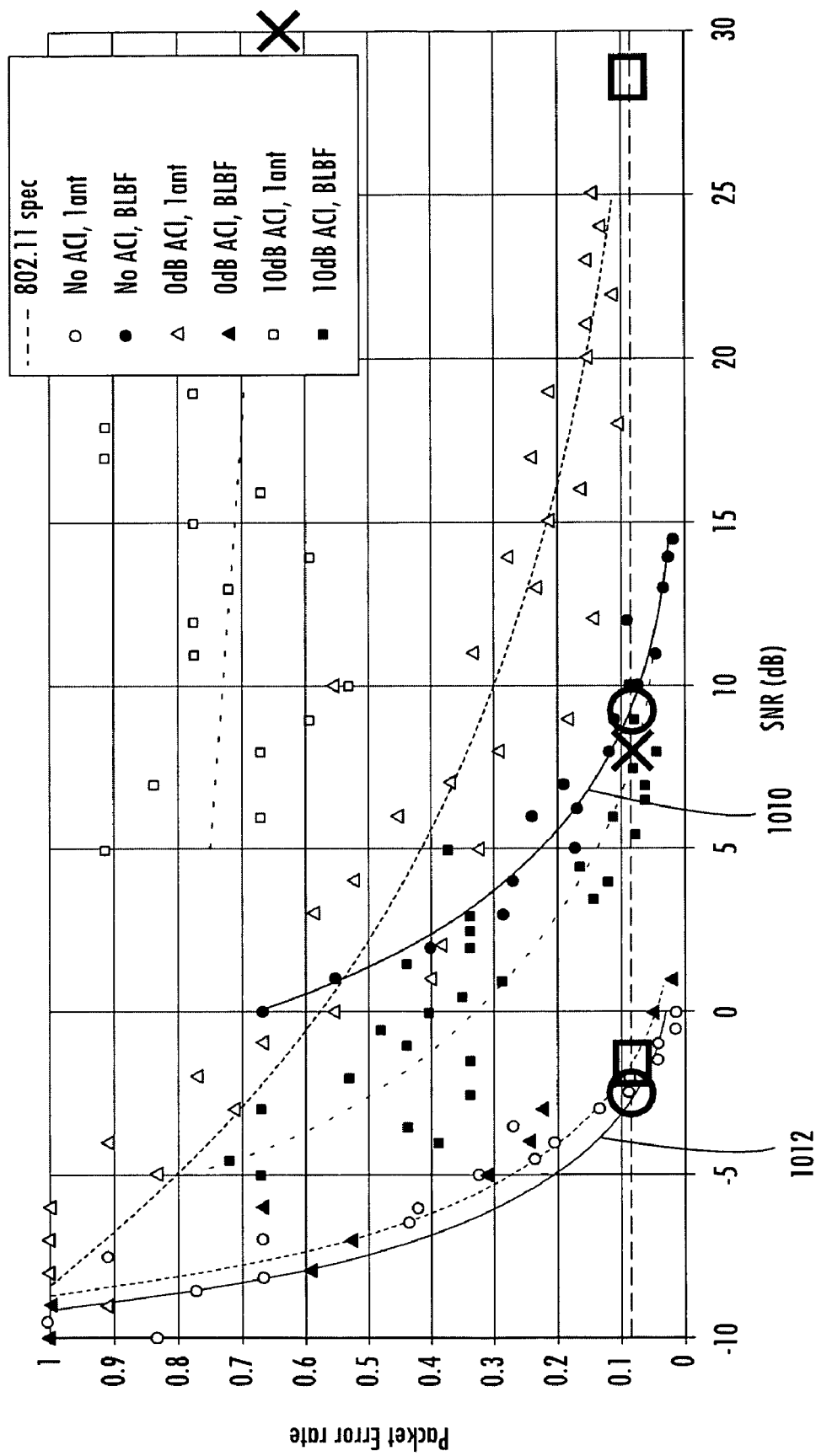
FIG. 13 is a graph of packet error rate versus received signal-to-noise ratio in the presence of interference.

FIG. 13 shows the in line packet error rate versus received signal-to-noise ratio for receiver with a single antenna 1010 versus receivers with four antennas and beam forming in line 1012 for an 802.11b Wireless LAN signal at four different data rates in the presence of an interference signal. It is shows that the signal-to-noise ratio to achieve a certain packet error rate is significantly lower for the case of four antennas with beam forming.

Figure 14:
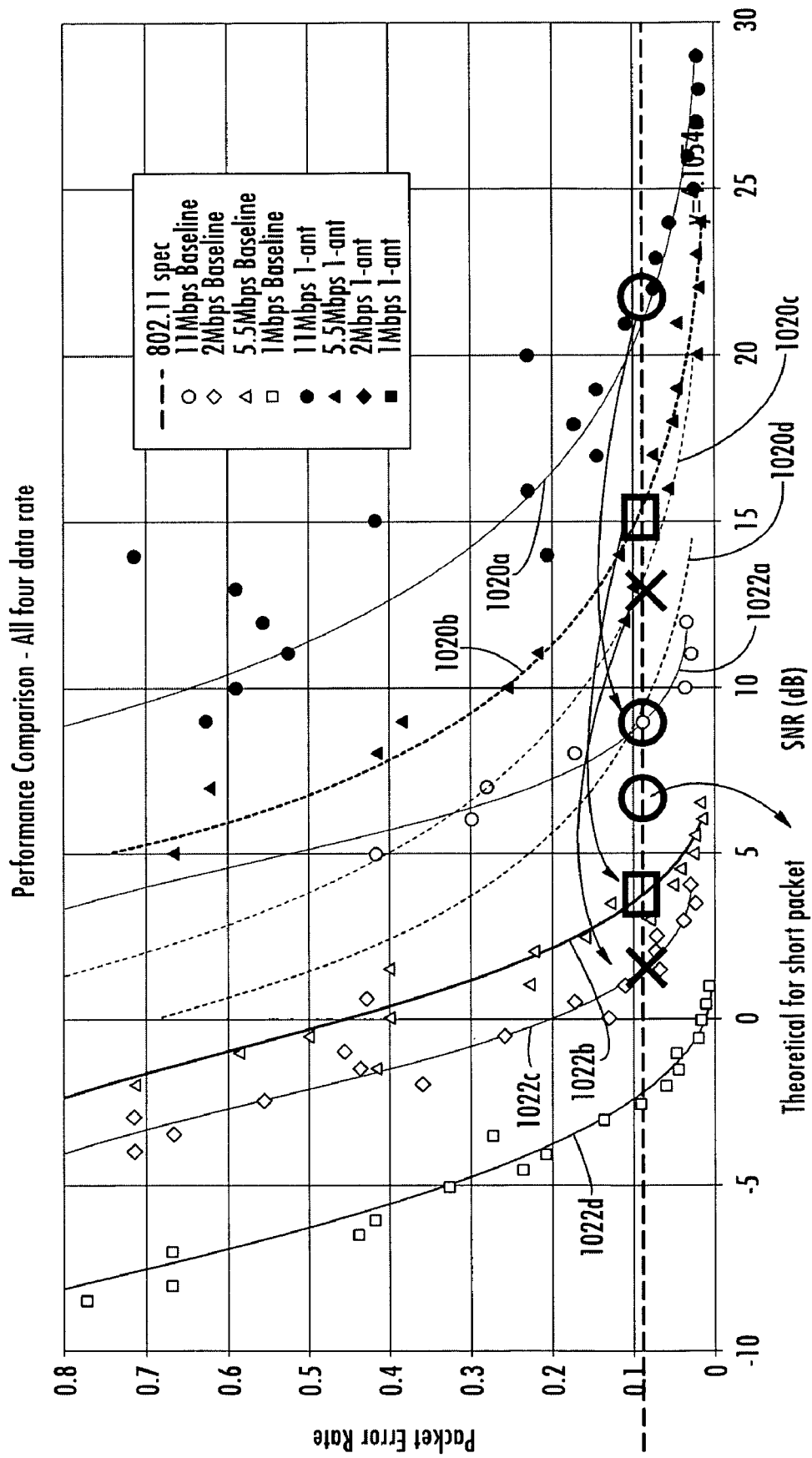
FIG. 14 is a graph of packet error rate versus received signal-to-noise ratio in the presence of a fading channel.

FIG. 14 shows the packet error rate versus received signal-to-noise ratio for a receiver with a single antenna in lines 1020a-d versus receivers with four antennas and beam forming in lines 1022a-d for an 802.11b Wireless LAN signal at four different data rates in a flat Rayleigh fading environment. The date rate of lines 1020a and 1022a is 11 mbps. The data rate of lines 1020b and 1022b is 2 mbps. The date rate of lines 1020c and 1022c is 5.5 mpbs. The data rate of lines 1020d and 1022d is 1 mbps. It is shown that the received signal-to-noise ratio improves by approximately 12 dB with the use of four antennas and adaptive beam forming as compared to a single antenna at the required 8% packet error rate.

It has been found that if the magnitude of the antenna weight is not controlled to proper range, the antenna weight can be at very small values resultant in the magnitude of the combined signal being substantially suppressed or conversely at very high values resulting in some of the hardware operating in saturation range.

The two time constants of the above described implementation of a closed loop combined MRC and INA include one time constant for controlling the magnitude of the antenna weights and one time constant for controlling the relative magnitude and phase. The two time constants can be adjusted independently. The above closed loop implementation for combined MRC and INA differs from a conventional closed loop implementation of MRC by having one loop embedded within the other loop. Accordingly, the implementation of combined MRC and INA can be described as a vector closed loop implementation.

The above implementations of combined MRC and INA, the low pass filtered signal is used to generate the MRC weights while the bandpass filtered signal is used to generate the interference suppression weights. Accordingly, the implementation achieves MRC when only the desired signal is present. The implementations are also capable of suppressing adjacent channel interference signal which can be substantially larger than the desired signal.

Accordingly, the implementation of combined MRC and INA allow simultaneous suppressing of an interference signal and achieving of maximal ratio combining. In addition, unlike the CMA algorithm the combined MRC and INA implementation is not restricted to a constant envelope signal.

Figure 15:
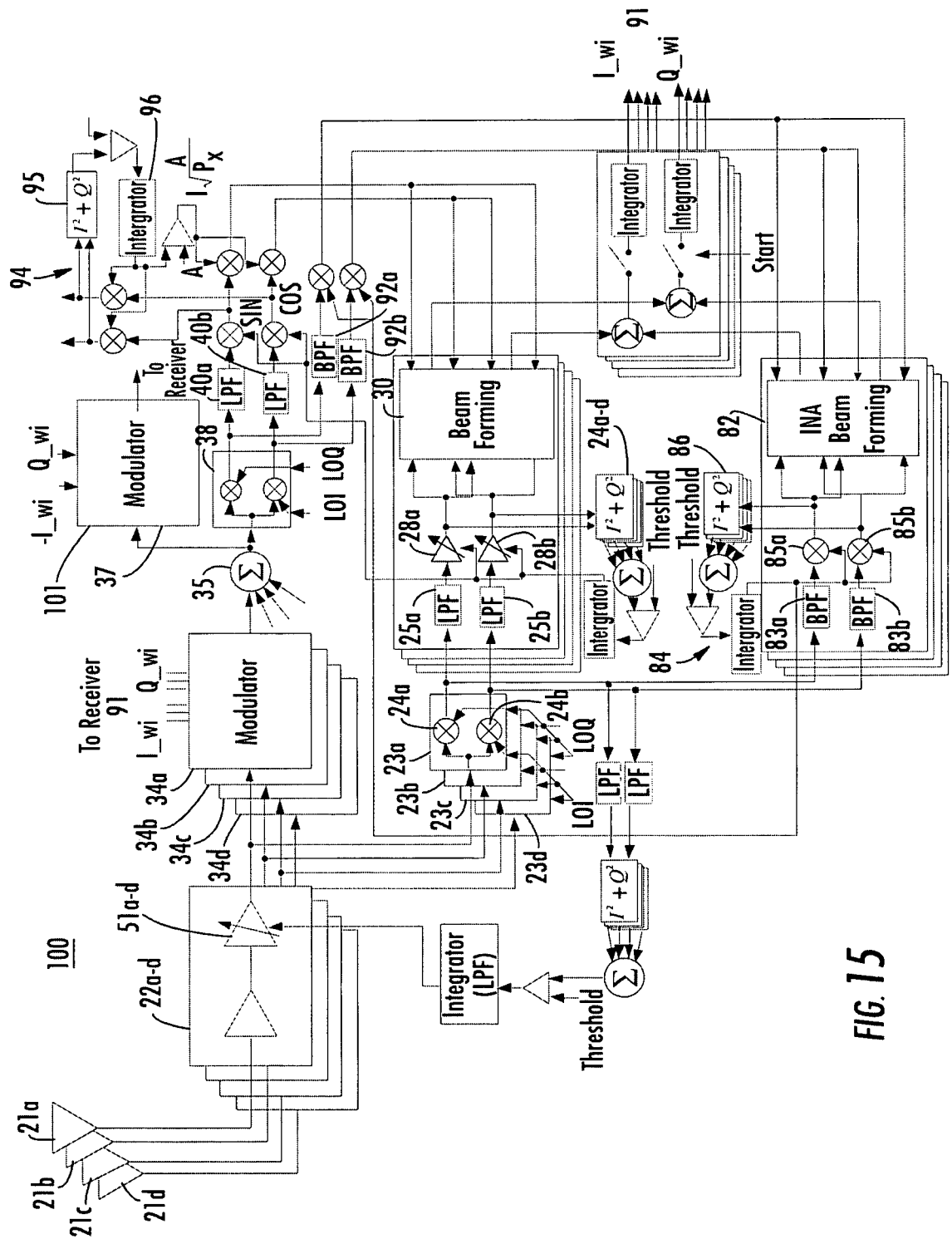
FIG. 15 is a schematic diagram of a receive beam forming system including an anti-rotation combined MRC and INA.

It has been found that if the sum signal experiences a different phase shift in the signal path from that of the four individual signal paths, the inputs to the integrators which generate the antenna weight (IWi and QWi) may contain a DC bias. The DC bias can generate antenna weights which rotate in low frequency. Since all weights rotate at the same frequency, this does not affect the beam forming results. However, the signal passed to the receiver is shifted in frequency. FIG. 15 illustrates an implementation of a receive beam forming system including an antirotation combined MRC and INA implementation. Modulator 101 applies the conjugate of one of the antenna weights to combined signal 37. Typically, the antenna weight with the largest magnitude is used in modulator 101.

It has been found that in the above-described implementation of combined MRC and INA, that there can be differences in the signal propagation delay in the sum path versus that in the individual path. If the signal delay through the sum path (the combined signal) is different from that of the individual path, the symbol transition timing in the sum signal can occur at a different time than in an individual channel. When the two signals from sum and individual channels are multiplied, an error term proportional to the offset in two bit transition times occurs. The error term contains random discrete phase values determined by the consecutive symbols. The error term can affect the computation of the antenna weight and contribute to error in antenna weight. It is therefore desirable to make the signal delay in the sum path and individual path the same.

Figure 16A:
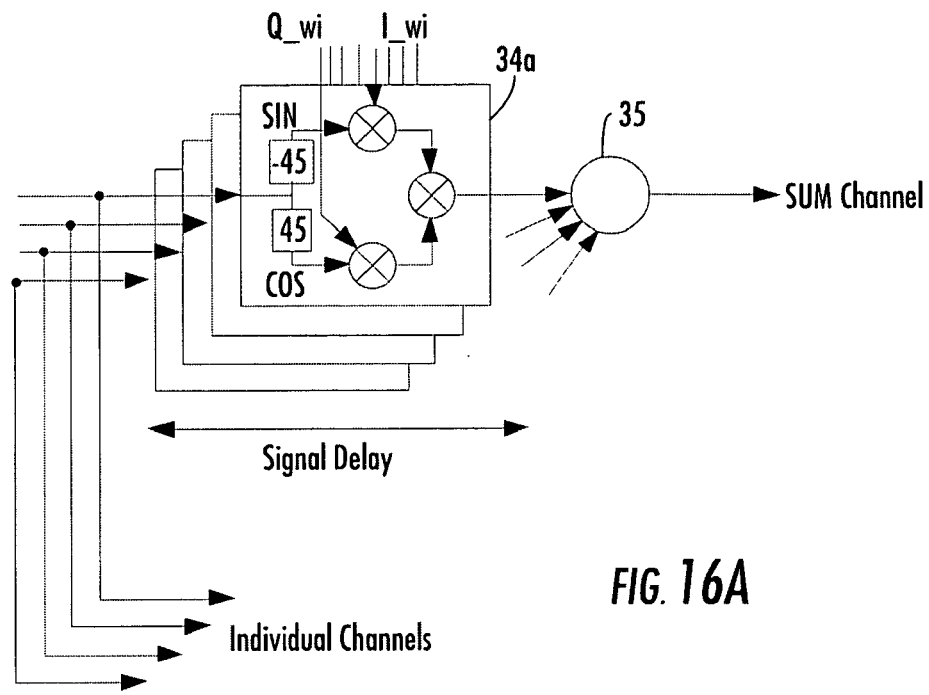
FIG. 16A is a schematic diagram of a modulator used in the sum path.
Figure 16B:
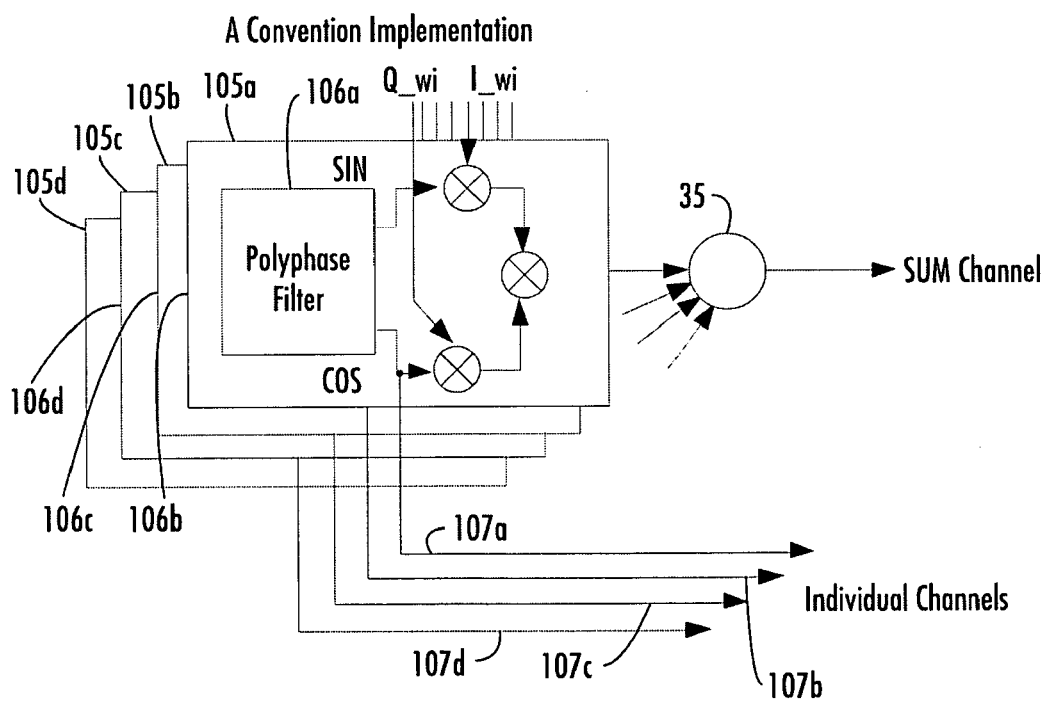
FIG. 16B is a schematic diagram of an alternate embodiment of a modulator used in the sum path.

It has been found that modulators 34a-d used in the sum path is a major source contributed to the difference in signal delay. FIG. 16A illustrates signal processing of conventional modulator 34a in which signal delay can occur between the sum channel and individual channels. FIG. 16B illustrates an implementation of a modulator used in the sum path with reduced delay difference. Modulator 105 can be used to replace modulator 34 used in the above-described implementation. Each of modulator 105a-d includes a respective polyphase filter 106a-d to generate 90 degrees quadrature signals. Individual channels 107a-d are obtained after respective polyphase filters 106a-d of modulators 105a-d. The group delay in the polyphase filter is the major contributor of the signal delay. If the individual channel is obtained from after the polyphase filter, the signal delay between the sum and individual channel can be significantly reduced.

Once received beam forming is achieved, as described above, a transmit antenna can also form a beam towards the desired signal direction by using the same antenna weights as described above. This can be implemented by freezing the received antenna weight must before the end of signal reception. The antenna weight is sampled and used for transmitting the signal.

Figure 17:
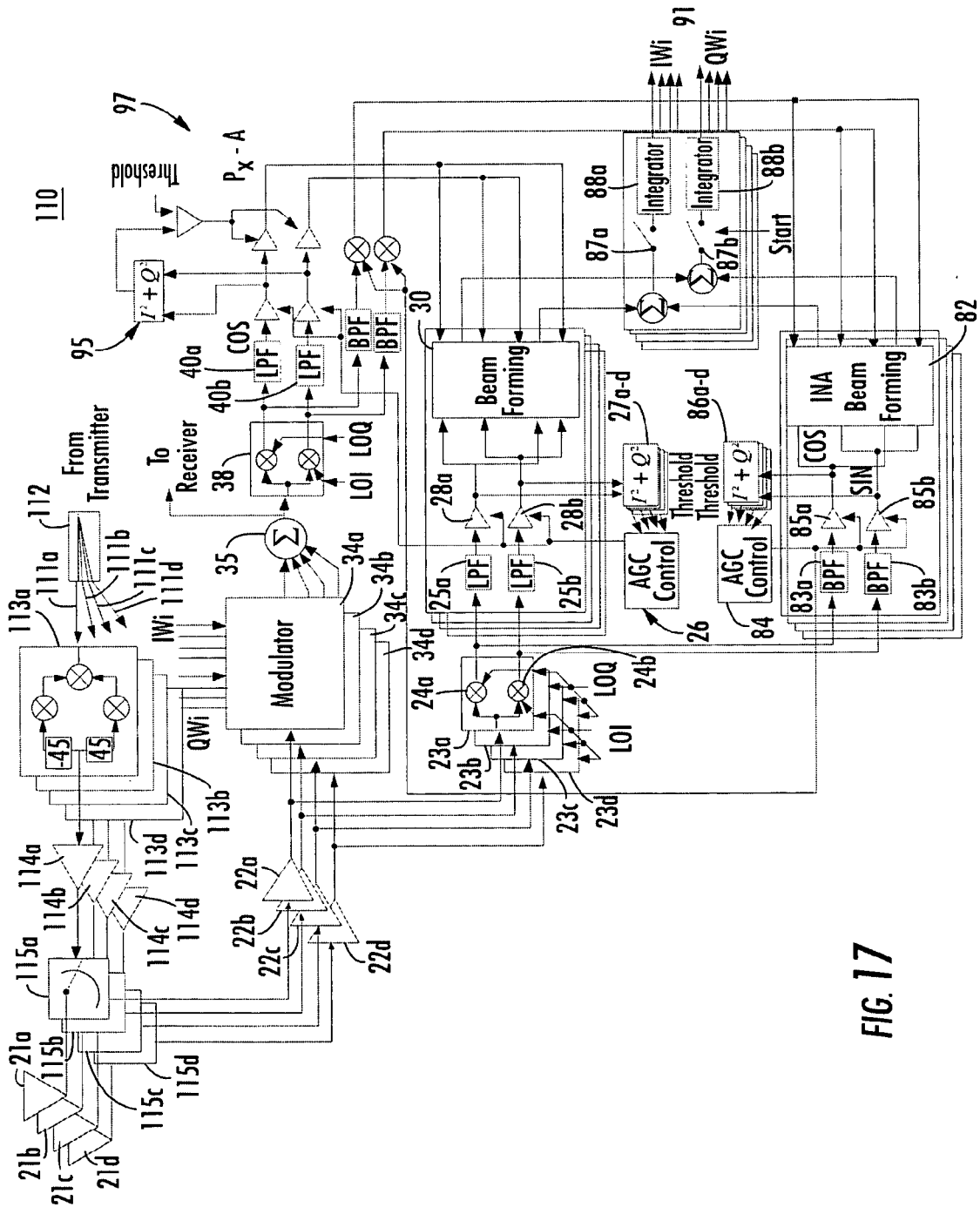
FIG. 17 is a schematic diagram of a transmit and receive beam forming system.

An overall block diagram for a time-division duplex (as in 802.11) transmit and receive beam forming system 110 is shown in FIG. 17. Signals 111 from transmitter 112 are modulated in modulators 113a-d. Outputs of modulators 113a-d are amplified in amplifiers 114a-d. Outputs from antennas 21a-d and amplifiers 114a-d are connected to switches 115a-d. Switch 115 is closed during signal reception to provide a connection and is opened before the end of signal reception. When switch 115 is open, the antenna weight is frozen. The complex conjugate antenna weight is then applied for transmit beam forming.

The signal format of the 802.11 WLAN contains a packet preamble. The conventional 802.11b network interface card (NIC) contains two receiving antennas. In the reception mode, the NIC alternates between two receiving antennas and attempting to acquire the incoming signal. As soon as NIC detects the arrival of the signal, it switches to the second antenna to see if it can get better signal quality. The NIC then uses the antenna with better signal quality throughout the rest of the packet. This technique is typically called antenna selection diversity. In 802.11b, the NIC spends approximately 20 microseconds from the beginning of the signal packet arrival for the antenna selection.

Figure 18:
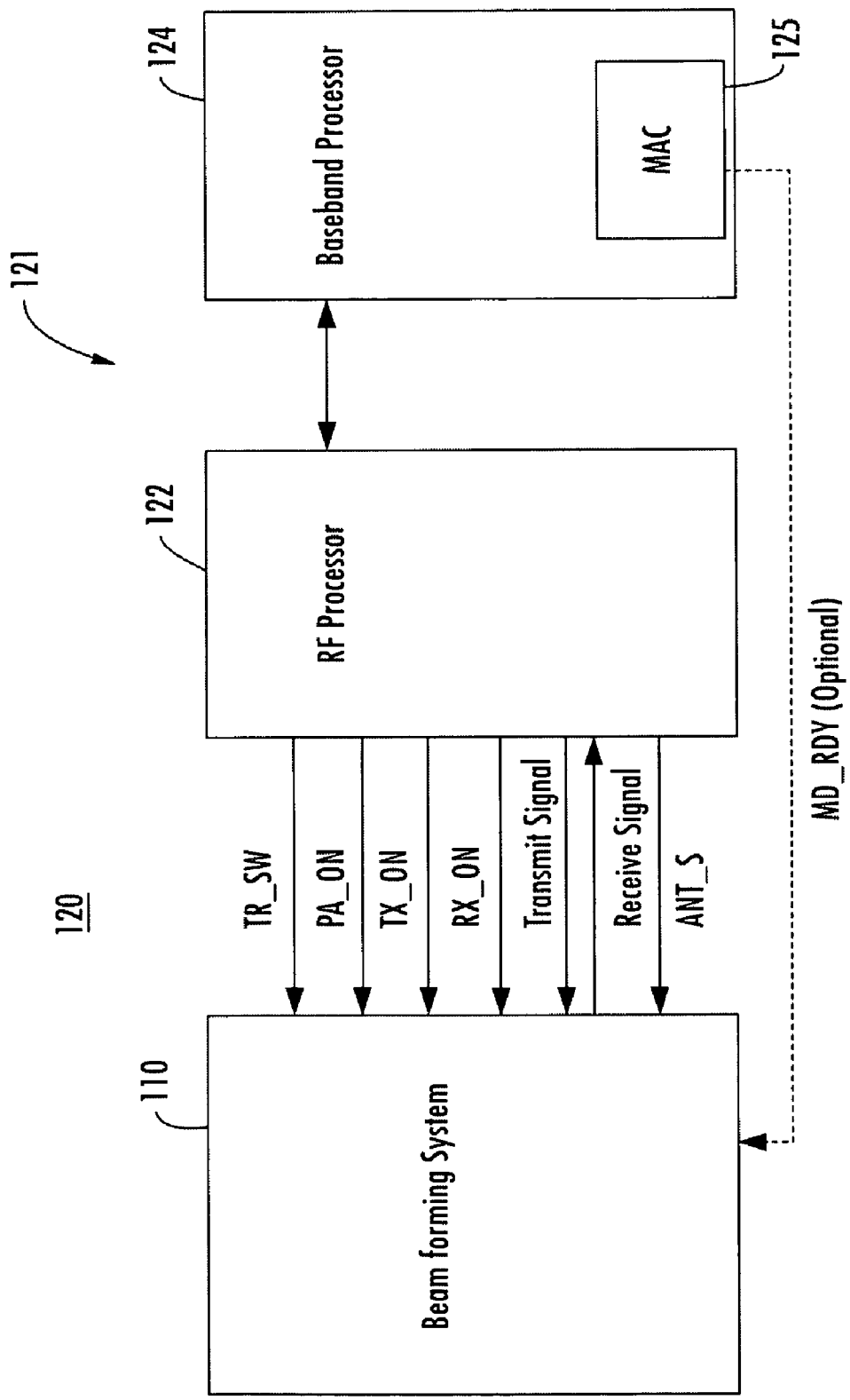
FIG. 18 is a schematic diagram of a control signal interface for an implementation in a network interface card (NIC).

An embodiment of a beam forming system 120 of the present invention for a 802.11 application is shown in FIG. 18. Beam forming system 120 of the present invention uses antenna combining instead of conventional antenna selection. Accordingly, the antenna selection control signal from the baseband processor in the 802.11 NIC would not be used in the present invention. In addition, if the antenna beam forming can be accomplished within the time period used for antenna selection, beam forming system 120 is compatible for use in the 802.11 system.

RF processor 122 of NIC 121 provides several control signals for implementing transmit-to-receive and receive-to-transmit switching (TR_SW), transmitter power on/off (PA_ON), receiver power on/off (RX_ON), and antenna selection (ANT_S).

During the receiving request, the RX_ON control signal indicates to turn on the power to the receiving section and to activate beam forming processing, as described above. For a point-to-point application, it is advantageous to freeze the antenna weight during reception and use the conjugate of the antenna weight for transmit beam forming with beam forming system 110. The beam forming can use the control signal RX_ON going from "ON" to "OFF" to freeze the antenna weight at the end of the packet and save the antenna weight for use in transmitting a signal. In some implementations, the transition of the RX_ON signal from "ON" to "OFF" state may lag the end of receiving packet. Accordingly, the antenna weight could change between the end of the receiving packet and the transition RX_ON. In an alternate embodiment, a different signal referred to as MD-RDY from baseband processor 124 in the NIC 121 is used. The signal MD_RDY occurs at the end of the preamble. When MD-RDY occurs, the beam forming system 120 freezes the antenna weight and saves it for transmit beam forming.

In implementation of NICs with an integrated baseband processor and MAC 125 controller, the MD_RDY signal is embedded within NIC 121 and is not available externally.

In an alternate approach, an ANT_S signal is used. Before the signal is detected, the ANT_S is programmed to switch between the two antennas. Once the signal is detected, baseband processor 124 determines which antenna to use and the ANT_S signal stops switching between the two antennas. Beam forming system 110 can monitor the ANT_S signal. If the duration in which the ANT_S is not switching exceeds a threshold, beam forming system 110 can assume that the signal is detected and can freeze the antenna weight.

The control signal to turn on the power amplifier (PA_ON) can precede the TR_SW signal which is used to connect the antenna to the transmit side. The MRC beam forming module 30 and INA beam forming module 82 of beam forming system 110 can use the PA_ON control signal to turn on transmitter 112 and transmit power amplifier 114a-d and load the transmit antenna weight.

Figure 19:
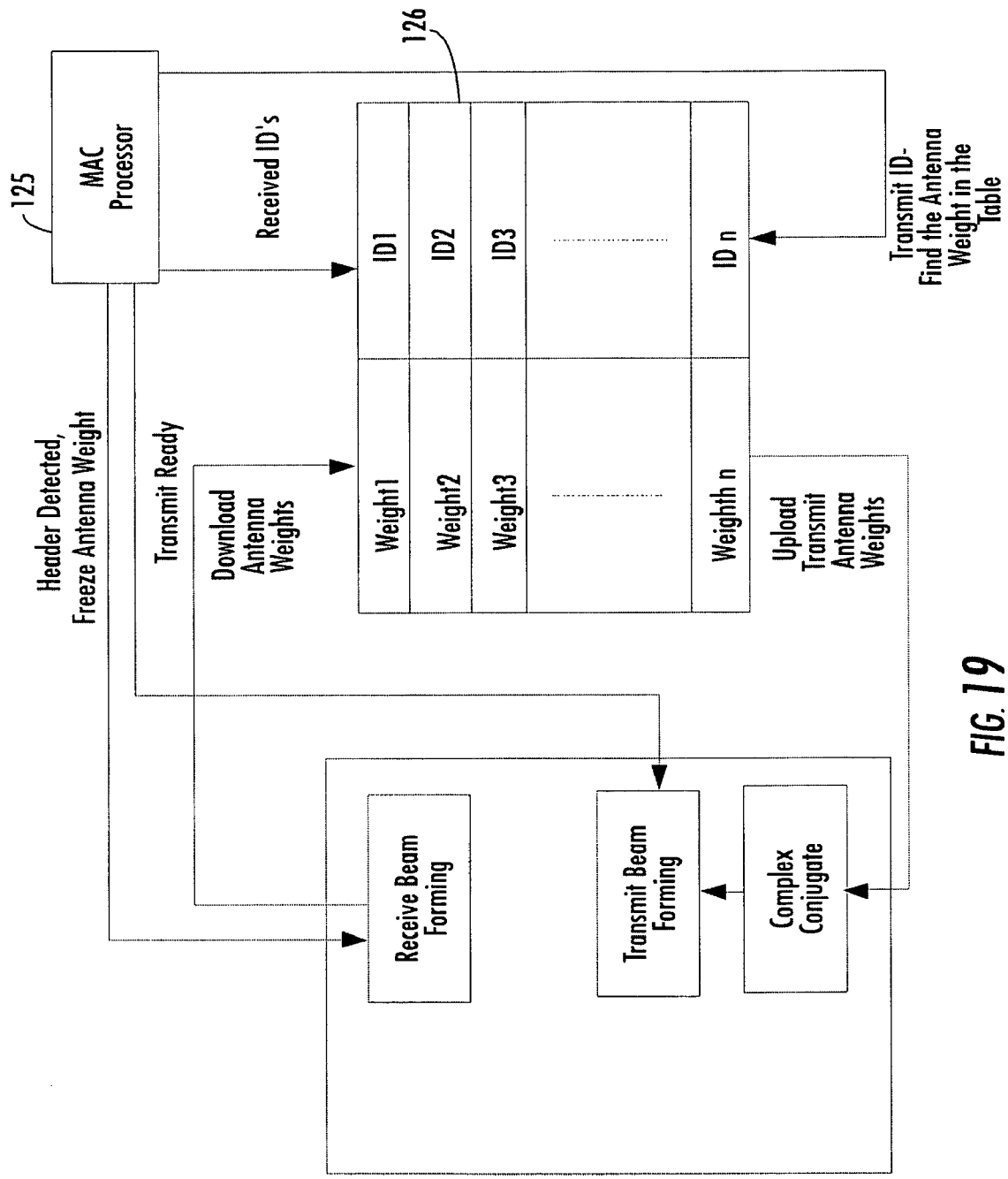
FIG. 19 is a schematic diagram of a point to multipoint transmit and receive beam forming system.

In point to multi-point systems such as 802.11, a base station (i.e., access point or hub) or a NIC can communicate with multiple client devices over time. The base station can form multiple sets of weights, each set for each client device. FIG. 19 shows an implementation of a base station management of multiple sets of antenna weights and forming the transmit beam for each individual client device when transmitting a signal to it. MAC controller 125 of baseband processor 124 provides an antenna weight hold control signal for beam forming system 110 when the desired signal is detected. The frozen antenna weight is then sampled with a multiplex analog-to-digital converter (ADC) or multiple ADCs. The antenna weight is then downloaded to MAC controller 125 in which the received signal ID is attached to the set of antenna weight and stored in memory 126. When MAC controller 125 transmits to a specific client device, the complex conjugate of the antenna weight derived from prior reception of that client signal is used as the transmit antenna weight to form the transmit beam toward the client device. This scheme allows the base station to manage multiple sets of the antenna weights associated with different client devices.

Figure 20:
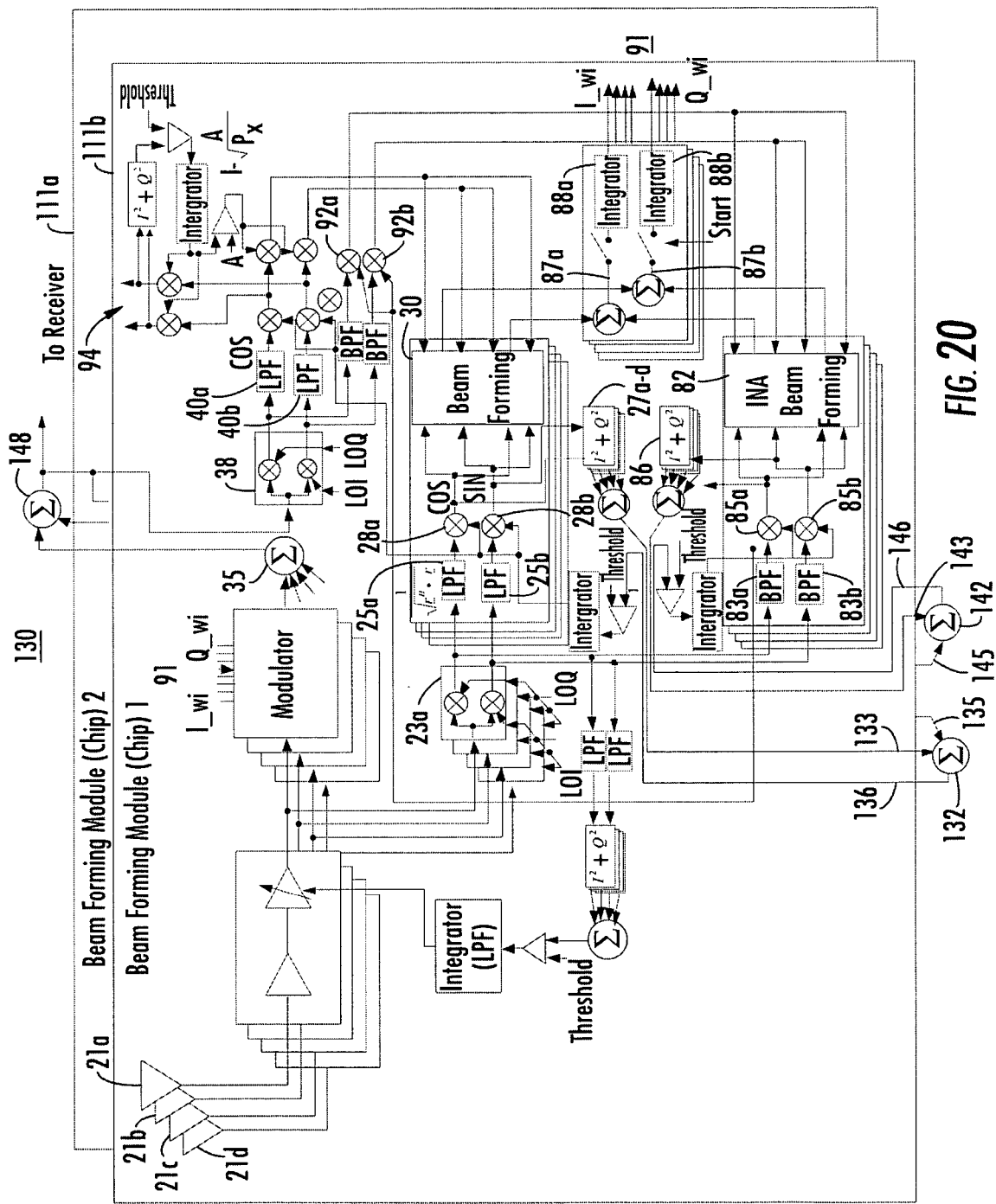
FIG. 20 is a schematic diagram of a cascadable architecture for combining a plurality of beam forming modules or chips.

FIG. 20 illustrates an alternate embodiment of a cascadable beam forming system 130 in which a plurality of beam forming modules are combined. In this embodiment, a plurality of beam forming systems 110a, 110b using combined MRC and INA are combined. It will be appreciated that any number and any of the above described beam forming systems can be combined in accordance with the teachings of the present invention.

Summer 132 combines output 133 from baseband AGC loop 26 of first beam forming system 110a and with output 135 from baseband AGC loop 26 of second beam forming system 110b. Combined output 136 from summer 132 is read back to variable gain amplifier 28a as the reference wave form. Summer 142 combines output 143 from AGC loop 84 at first beam forming system 110a with output 145 from AGC loop 84 of second beam forming system 110b. Combined output 146 from summer 142 is fed back to variable gain amplifier 28b as the reference wave form.

Summer 148 combines output 137 from summer 35 of first beam forming system 110a with output 137 from summer 35 of second beam forming system 110b to form combined signal 36 Accordingly, the sum of power from first beam forming system 110a and second beam forming system 110b is used in the normalization process of MRC beam forming module 30 and INA beam forming module 82. In this embodiment, summers 132, 142 and 148 are outside of first beam forming system 110a or second beam forming system 110b. In an alternate embodiment, one or more of summers 132, 142 and 148 can reside with one of first beam forming system 110a or second beam forming system 110b.

A desirable feature for 802.11 wireless devices is lower power consumption. In one embodiment, an open loop control algorithm is used which uses the received signal quality to judge how much transmitted power is needed. In an alternate embodiment, a closed loop control algorithm is used to transmit the received signal quality information back to the sender to inform the sender how much transmit power should be used. The present invention has the advantage that since the antenna diversity and combining gain is high, the transmit power can be reduced.

Figure 21:
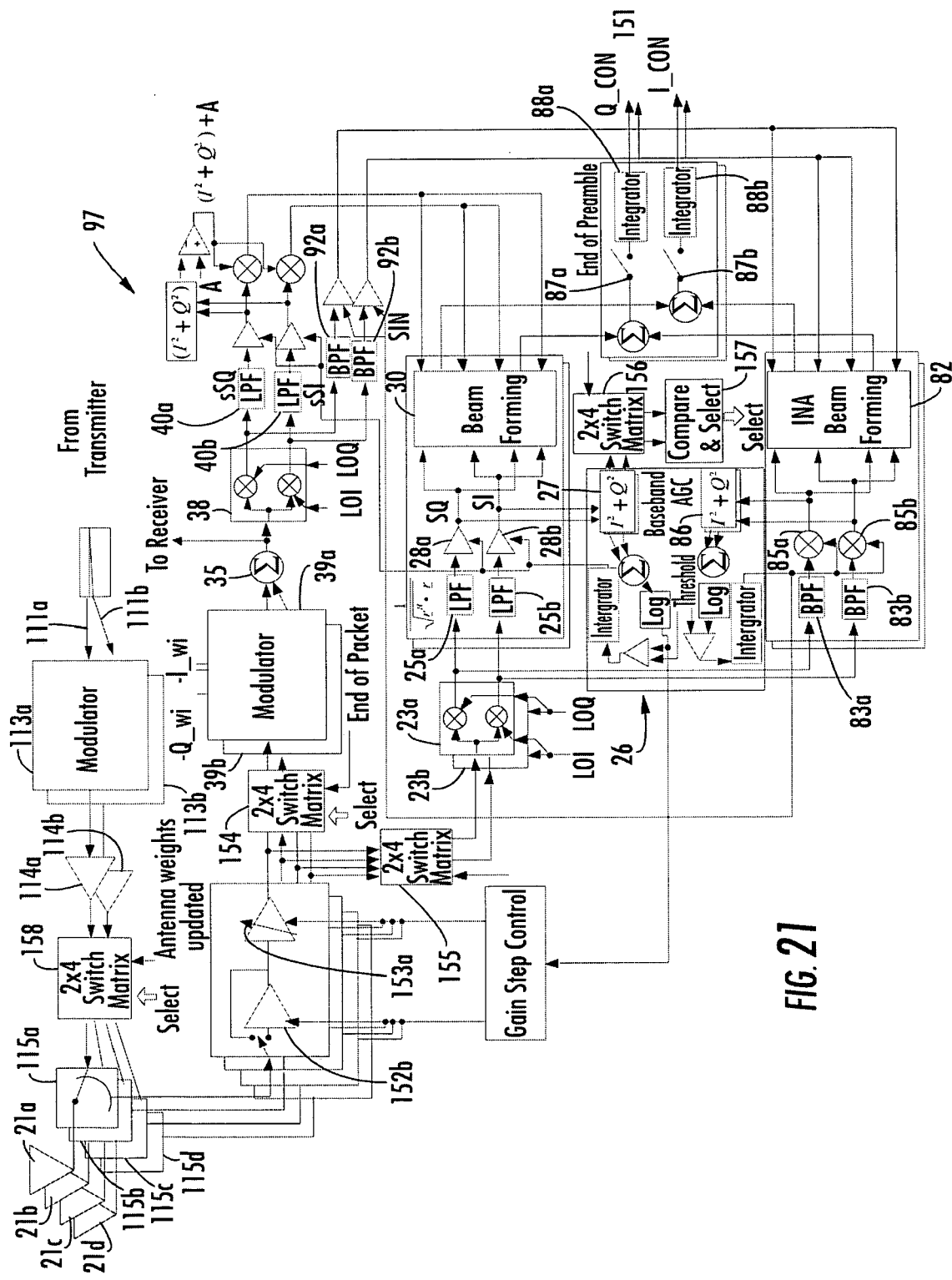
FIG. 21 is a schematic diagram of a hybrid selection and combining beam forming system.

In an alternate embodiment, a combination of antenna selection and combining can be used to achieve hardware savings and lower power consumption. FIG. 21 is a schematic diagram of a hybrid selection and combining beam forming system 150. In this embodiment, two of antennas 21a-d having a highest received power are selected and combined. During a first packet, MRC combining will be performed in the preamble using MRC beam forming module 30. Antenna weights 151 generated from MRC beam forming module 30 are frozen at the end of the preamble. Outputs of switches 115 are applied to low noise amplifiers (LNA) 152a-d. Outputs of LNAs 152a-d are amplified with respective variable gain amplifier (VGA) 153a-d. Output from VGAs 153a-d is applied to switch 154 and switch 155. For example, switch 154 and switch 155 can be a 4×2 matrix switch. Alternatively, switch 154 and switch 155 can be two 2×1 matrix switches.

Two downconverters 23a, 23b are connected by switch 155 to two of antennas 21 at the end of the preamble. Baseband power detector 27 of AGC loop 26 applies output to switch 156 and compares the power in compare and select module 157 to select two antennas of antennas 21a-d with the highest power for a second pass packet. At the end of the first packet, switches 154 and 155 switch receiver processing to the newly selected two higher power antennas of antennas 21a-d in preparation for a subsequent packet and processing with MRC beam forming module 30 and INA beam forming module 82. Switch 158 switches to the two antennas 21a-d selected as having the higher power as soon as antenna weights 151 are updated.

In this embodiment, four additional switches 154, 155, 156 and 158 and four sets of LNA 152a-d and VGA 153a-d are used while two sets of other processing elements, such as modulators 34a, 34b and downconverters 23a, 23b are used. Accordingly, the die size is close to 60% of the chip described in FIG. 18, and the power consumption will be less than 60% of the chip described in FIG. 18. It has been found that system 150 using 4×2 switches and four antenna element 21a-d achieves a 10 dB gain improvement over a single antenna in a Rayleigh fading environment. System 150 including two 2×1 switches and four antenna elements 21a-21d achieves a 9 dB gain improvement over a single converted antenna in a Rayleigh fading environment.

It will be appreciated that depending on how much beamforming gain is required, the DC power to some of the processing chains which are used for each of antennas 21a-d can be turned on or off. On transmission, each transmit chain requires power, even if the transmitted signal power with that chain is very low. Accordingly, it may be advantageous in terms of total power consumption to turn off some chains, even though more transit power may be required in other chains.

If the received power is high enough, the array gain may not be needed and only one antenna 21 can be used. In this case, the entire baseband processing can be turned off with switch 155. If the received power falls into the range where multiple antennas should be used, multiple processing chains of antennas 21 can be activated. Depending on how may processing chains are activated, the normalization threshold and loop parameters and the parameters of MRC beam forming module 30 and INA beam forming module 82 are adjusted. For example, if two antenna processing chains are used instead of four, the threshold in AGC loop 26 is reduced by a factor of two.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for operating a wireless communication system receiver comprising the steps of: receiving a plurality of input signals; weighting said plurality of input signals; and combining said weighted plurality of signals to form an output signal, wherein weights used in said weighting step are adjusted to increase power in said output signal of in-band components and decrease power in said output signal of out-of-band components, wherein said weights are determined by maximal ratio combining (MRC) to align phases of said input signals to the same phase and to scale said input signals in proportion to a square root of a received signal-to-noise ratio.

2. The method of claim 1 further comprising the step of normalizing the signal level before the step of weighting said plurality of input signals.

3. The method of claim 1 further comprising the step of: adjusting a signal level of the received input signals if said signal level is greater than a predetermined value.

4. The method of claim 1 further comprising the step of: maintaining a magnitude of said weights.

5. The method of claim 1 wherein said weights are applied to a respective one at said input signals using a modulator further comprising the step of: implementing said modulator to reduce signal delay between a sum path for the combined signals and individual channels receiving said plurality of input signals.

6. The method of claim 5 wherein a polyphase filter is used in said modulator to generate 90 degree quadrature signals.

7. The method of 1 wherein said weights used in said weighting step are adjusted by the step of adding an error signal into said weights to cancel said out-of-band components wherein said error signal is 180 degrees out of phase with a sum channel combining said plurality of input signals.

8. The method of claim 1 wherein said weights are determined by a combination of maximal ratio combining (MRC) to align phases of said input signals to the same phase and to scale said input signals in proportion to a square root of a received signal-to-noise ratio and an interference nulling algorithm (INA) for generating said weights using an error signal which is 180 degrees out of phase with a sum channel combining said plurality of said input signals.

9. The method of claim 1 wherein after said combining step further comprising the step of applying a conjugate of one of said weights to said output signal wherein said conjugate of one of said weights is determined from said weight having a largest magnitude.

10. The method of claim 8 further comprising the step of: combining said weights determined from said MRC with weights determined from one or more second MRC; and combining weights determined from said INA with weights determined from one or more second INA.

11. A method for operating a transmit and receive beam forming system comprising the steps of: a. receiving a plurality of input signals; b. weighting said plurality of input signals with weights, weights are adjusted to increase power in said output signal of in-band components and decrease power in said output signal of out-of-band components; and c. combining said weighted plurality of signals to form an output signal; d. transmitting a beam towards a desired signal detecting wherein a complex conjugate said weights are used for transmitting said beam wherein after said step b. said weights are frozen and said weights are applied for transmitting in step d wherein said input signal is a time division duplex signal and a control signal is used to freeze said weights at an end of packet and use said weights for transmitting a signal in step d.

12. The method of claim 11 wherein said control signal occurs at an end of a preamble of said packet and when said control signal occurs said weights are frozen and are used in transmitting step d.

13. A system for operating a wireless communication system receiver comprising: means for receiving a plurality of input signals; means for weighting said plurality of input signals; and means for combining said weighted plurality of signals to form an output signal, wherein weights used in said weighting step are adjusted to increase power in said output signal of in-band components and decrease power in said output signal of out-of-band components wherein said weights are determined by maximal ratio combining (MRC) to align phases of said input signals to the same phase and to scale input signals in proportion to a square root of a received signal-to-noise ratio.

14. The system of claim 13 further comprising means for normalizing the signal level before weighting said plurality of input signals.

15. The system of claim 13 further comprising: means for adjusting a signal level of the received input signals if said signal level is greater than a predetermined value.

16. The system of claim 13 further comprising: means for maintaining a magnitude of said weights.

17. The system of claim 13 wherein said weights are applied to a respective one at said input signals using a modulator wherein said modulator reduces signal delay between a sum path for the combined signals and individual channels receiving said plurality of input signals.

18. The system of claim 17 wherein a polyphase filter is used in said modulator to generate 90 degree quadrature signals.

19. The system of claim 13 wherein said weights are adjusted by adding an error signal into said weights to cancel out-of-band components wherein said error signal is 180 degrees out of phase with a sum channel combining said plurality of input signals.

20. The system of claim 13 wherein said weights are determined by a combination of maximal ratio combining (MRC) to align phases of said input signals to the same phase and to scale said input signals in proportion to a square root of a received signal-to-noise ratio and an interference nulling algorithm (INA) for generating said weights using an error signal which is 180 degrees out of phase with a sum channel combining said plurality of said input signals.

21. The system of claim 20 wherein said conjugate of one of said weights is determined from said one of said weight having a largest magnitude.

22. A system for operating a transmit and receive beam forming system comprising: means for receiving a plurality of input signals; means for weighting said plurality of input signals with weights, weights are adjusted to increase power in said output signal of in-band components and decrease power in said output signal of out-of-band components; and means for combining said weighted plurality of signals to form an output signal; means for transmitting a beam towards a desired signal detecting wherein a complex conjugate said weights are used for transmitting said beam wherein said input signal is a time division duplex signal and a control signal is used to freeze said weights at an end of packet and use said weights is said means for transmitting a beam wherein said control signal occurs at an end of a preamble of said packet and when said control signal occurs said weights are frozen and are used in said means for transmitting.

23. The system of claim 22 wherein said system is used for a plurality of devices and further comprising: means for identifying said weights for one of said devices; and means for storing said identified weights; and said means for transmitting receiving said stored identified weight for said device for use in transmitting.

* * * * *